United States Patent [19]

Kobayashi et al.

[11] Patent Number: 4,747,699
[45] Date of Patent: May 31, 1988

[54] THERMAL-ENVIRONMENT SENSOR WITH MEANS TO SIMULATE EMISSIVITY OF HUMAN BODY

[75] Inventors: Masahiro Kobayashi; Noboru Kobayashi; Kunikazu Torikoshi; Shigehiro Uemura, all of Sakai, Japan

[73] Assignee: Daikin Industries, Ltd., Osaka, Japan

[21] Appl. No.: 917,943

[22] PCT Filed: Feb. 6, 1986

[86] PCT No.: PCT/JP86/00048
§ 371 Date: Oct. 4, 1986
§ 102(e) Date: Oct. 4, 1986

[87] PCT Pub. No.: WO86/04674
PCT Pub. Date: Aug. 14, 1986

[30] Foreign Application Priority Data

| Feb. 6, 1985 | [JP] | Japan | 60-22327 |
| Feb. 6, 1985 | [JP] | Japan | 60-22328 |
| Nov. 26, 1985 | [JP] | Japan | 60-265324 |
| Nov. 26, 1985 | [JP] | Japan | 60-265325 |
| Nov. 26, 1985 | [JP] | Japan | 60-265326 |
| Nov. 26, 1985 | [JP] | Japan | 60-265327 |
| Nov. 26, 1985 | [JP] | Japan | 60-181869[U] |
| Nov. 26, 1985 | [JP] | Japan | 60-181870[U] |
| Nov. 26, 1985 | [JP] | Japan | 60-181871[U] |

[51] Int. Cl.⁴ .......................... G01J 5/02; G01K 3/00
[52] U.S. Cl. ........................................ 374/109; 374/9
[58] Field of Search ................. 374/109, 9; 236/91 C, 236/91 D

[56] References Cited

U.S. PATENT DOCUMENTS

| 3,326,045 | 6/1967 | Vrsaljko | 374/109 X |
| 4,058,254 | 11/1977 | Hallgreen | 374/109 X |
| 4,274,475 | 6/1981 | Rall et al. | 374/109 X |
| 4,446,913 | 5/1984 | Krocker | 374/109 X |
| 4,504,157 | 3/1985 | Crabtree et al. | 374/109 |
| 4,592,661 | 6/1986 | Wilson | 374/109 X |

FOREIGN PATENT DOCUMENTS

| 55-060513 | 4/1980 | Japan. |
| 56-006689 | 2/1981 | Japan. |
| 58-218624 | 12/1983 | Japan. |
| 59-104016 | 7/1984 | Japan. |
| 60-192976 | 10/1985 | Japan. |

Primary Examiner—Daniel M. Yasich
Attorney, Agent, or Firm—Wenderoth, Lind & Ponack

[57] ABSTRACT

In a thermal-environment sensor which detects thermal conditions in an indoor environment based on the surface temperature of a heating element supplied with a thermal quantity, the spectral emissivity of the outer surface of said heating element closely conforming to the spectral emissivity of the surface of the human skin or clothes thereon so as to bring the radiant heat transfer coefficient of the sensor remarkably near that of the human body.

21 Claims, 22 Drawing Sheets

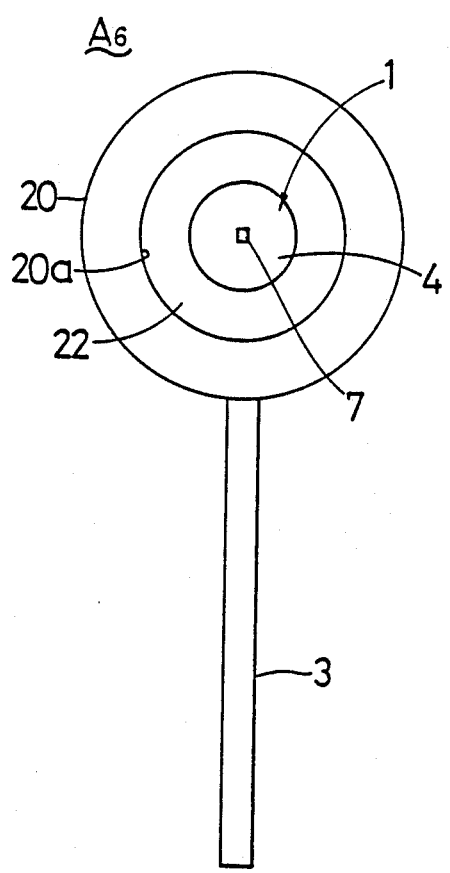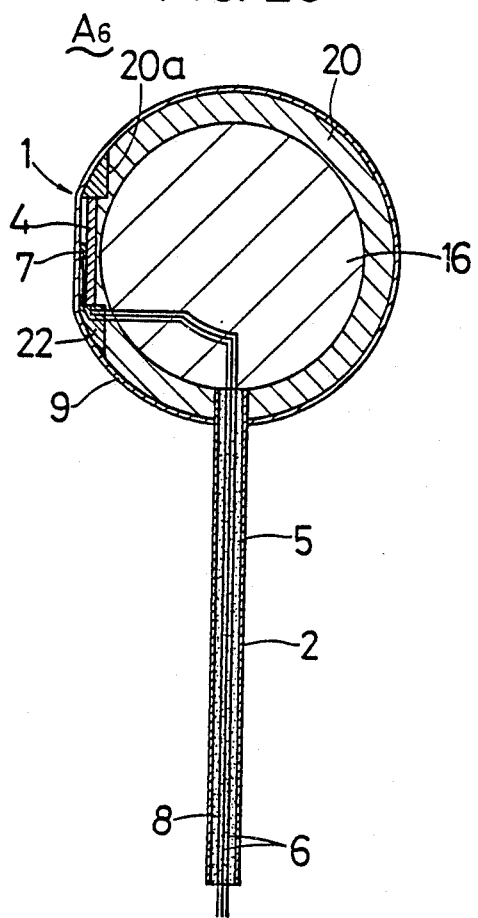

FIG. 27
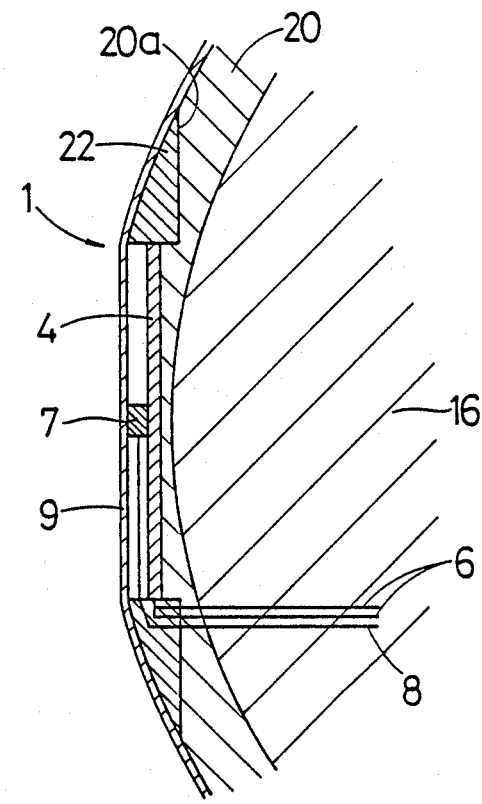
FIG. 28
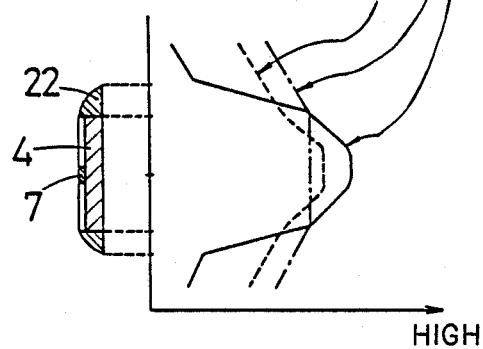
THE EXAMPLE OF THIS INVENTION
THE COMPARED EXAMPLE NO.2
THE COMPARED EXAMPLE NO.1
HIGH
THE SURFACE TEMPERATURE
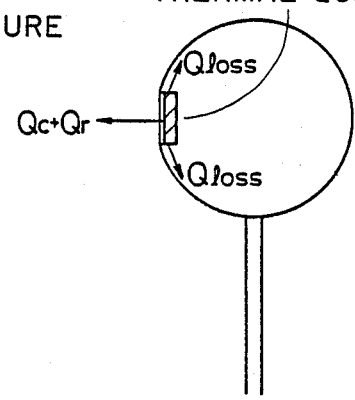
FIG. 29

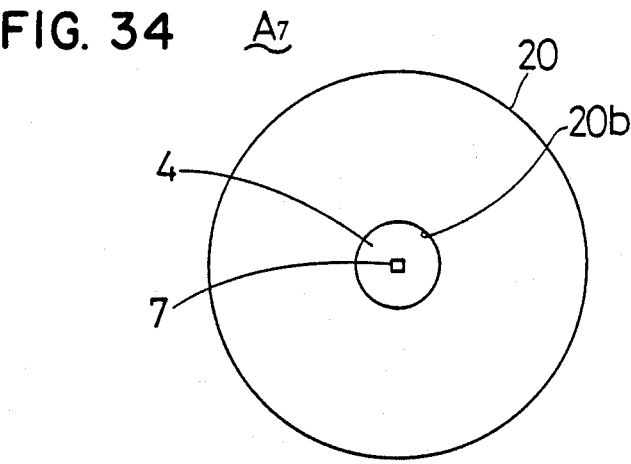
FIG. 34
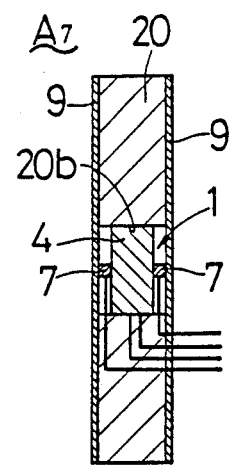
FIG. 33
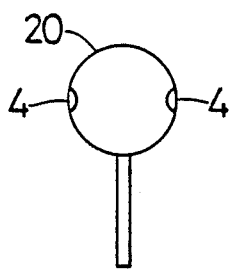
FIG. 30
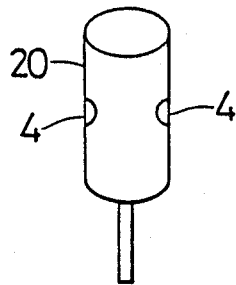
FIG. 31
FIG. 32

THERMAL-ENVIRONMENT SENSOR WITH MEANS TO SIMULATE EMISSIVITY OF HUMAN BODY

(FIELD OF THE ART)

The present invention relates to a thermal-environment sensor to detect thermal conditions in an indoor environment which provide the data for the control of an air-conditioning system, for example, when it supplies the human body in a room with a comfortable thermal environment; in particular, it relates to the thermal-environment sensor, the emissivity of which corresponds to that of the human body.

(BACKGROUND OF THE ART)

Generally there is a limit to keeping a room under comfortable thermal conditions for the human body by an air-conditioning system which controls only room-temperature; therefore it is necessary to estimate the actual residential thermal environment by other factors of the thermal environment, that is, the total physical quantities of the speed of the air flow, the humidity, and the radiation. And to detect said thermal conditions, it is required that a thermal-environment sensor should be composed so as to have a mutual thermal relationship between said sensor and the human body based on the thermal equilibrium of the human body.

It should be noted, as disclosed in the official gazette, TOKKAISHO No. 58-218624 in Japan, that a similar kind of sensor exists, which comprises an electric heating element having an electric heater in an empty shell and a thermometer for measuring the surface temperature of said heating element, and which detects thermal conditions in an indoor environment considering the radiation by measuring the surface temperature of said heating element after supplying it with the predetermined thermal quantity by feeding an electric flow to said electric heater.

In the above conventional type sensor, the emissivity of the outer surface of the heating element closely conforms to the emissivity of the surface of the human skin or clothes thereon so as to establish a correlation regarding the thermal equilibrium between the sensor and the human body, considering radiation. But this sensor can detect only the rate of radiation and emission of a heat radiator (the heating element and the human body) with emissivity, whereas the rate of absorption of incident radiation from the outside (radiation from the wall and solar radiation) cannot be detected precisely. That is, regarding radiation from an object which has a similar temperature to the heat radiation (the heating element and the human body) such as radiation from the wall, emissivity is closely equal to absorptivity because the spectral distribution of the radiation is similar to that of the incidence, but regarding extraneous incident radiation in which there is a difference between the spectral distribution of radiation and that of the incidence, such as solar radiation or radiation from a heating apparatus, emissivity and absorptivity in said radiator (the heating element and the human body) do not always conform to each other. Therefore, if the spectral emissivity (equal to the spectral absorptivity) of said heating element does not conform to the spectral emissivity (equal to the spectral absorptivity) of the human body, in the case that there is a difference between the spectral distribution of radiation and that of the incidence, it is difficult to accurately detect the thermal environment due to the low accuracy of substantial conformity in the correlation regarding thermal characteristics between the surface of the sensor and that of the human body.

In regard to this point, the correlation regarding thermal characteristics between the above-composed thermal-environment sensor and the human body is described in detail as follows:

that is, the thermal equilibrium expression of said thermal-environment sensor is given by:

$$M = hgr(Tg - Tr) + hgc(Tg - Ta) \qquad [1]$$

(whereas, M: the supplied thermal quantity; Tg: the surface temperature of the heating element; Tr: the mean radiant temperature in a room environment; Ta: the temperature of the air; hgr: the radiant heat transfer coefficient of the heating element; hgc: the convective heat transfer coefficient of the heating elememt).

Meanwhile, the expression which calculates heat, Hsk lost from the human skin under the optional variable temperature environments is:

$$Hsk = R + C + E \qquad [2],$$

in this case, R, C, and E express each thermal loss by radiation, convection, and evaporation from the human body, and the expression of each thermal loss of the above-mentioned R, C, and E is as follows:

$$R = hr \cdot Fcl \cdot (Tsk - Tr) \qquad [3]$$

$$C = hc \cdot Fcl \cdot (Tsk - Ta) \qquad [4]$$

$$E = w \cdot k \cdot h_3 \cdot Fpcl \cdot (Psk - \phi a \cdot Pa) \qquad [5]$$

(whereas, hr: the radiant heat transfer coefficient of the human body; hc: the convective heat transfer coefficient of the human body; $\phi a$: the relative humidity; Psk: the saturated vapor pressure under the mean temperature of the human skin, Tsk; Pa: the saturated vapor pressure under the temperature of the air, Ta; w: the rate of the wet area of the skin; Fcl: a coefficient of the heat resistance of clothes; Fpcl: the transmission coefficient of the clothes against vapor evaporated from the surface of the human skin to the surroundings thereof; k: 2.2 at sea level, the Lewis relationship).

In the case of estimating thermal comfort in a room by adopting the new standard effective temperature, SET* -which has a close relationship to the sense of coldness or warmth and the comfortableness of the human body, and which was set by ASHRAE, the American Society of Heating-Refrigerating and Air-conditioning Engineers in the U.S.A.-, is determined as follows so that the thermal loss calculated based on that theory is equal to Hsk in the above expression [2]:

$$Hsk = hs \cdot Fcls \cdot (Tsk - SET^*) + w \cdot k \cdot hcs \cdot Fpcls \cdot (Psk - 0.5 \cdot Pset^*) \qquad [6]$$

(whereas, hcs: the convective heat transfer coefficient of the human body in the standard air flow; hs: the heat transfer coefficient, the sum of the radiant heat transfer coefficient, hr of the human body and the convective heat transfer coefficient hcs of the human body in a normal state; Pset*: the saturated vapor pressure under SET*:; Fcls: the coefficient of heat resistance in the case of the quantity of the clothes equal to 0.6 clo; Fpcls: the transmission coefficient of the clothes against evaporated water vapor in the case of the quantity of clothes equal to 0.6 clo).

In other words, SET* is the temperature defined as the uniform temperature environment under which the heat value equal to Hsk given by the expression [2] can be lost in a normal state (the quantity of clothes equal to 0.6 clo; the speed of the air flow equal to 0.1 m/s to 0.15 m/s; the humidity equal to 50%, Tr=Ta) and in the equal physiology state (equal conditions regarding Tsk, w), and moreover, SET* depends on the thermal conditions in the room, namely, the temperature of the air, Ta; the mean radiant temperature, Tr; the speed of the air flow: for example, when the speed of the air flow is 0.1 m/s to 0.15 m/s in a normal state where the quantity of clothes is 0.6 clo; the humidity is 50%; generated heat quantity is 1 Met (=58.2 W/m$^2$), if SET* is 22.2° C. to 25.6° C., ASHRAE agreed that more than 80% of people feel comfortable in the thermal environment.

In the above thermal equilibrium expression [2] for the human body, by establishing the situation without an action for perspiration of the human body (w=0.06) to consider evaporative heat loss and a range of comfortable temperatures (the temperature of the air is 22° C. to 26° C.) and also by establishing the condition that the relative humidity $\phi a$ is set at 0.5, the right side, C+E is approximately concluded as follows:

$$C+E = hc' \cdot Fcl \cdot (Tsk - Ta) \quad [7]$$

(whereas, hc': the convective heat transfer coefficient of the human body considering evaporation), then, said expression [2] is replaced by:

$$Hsk/Fcl = hr(Tsk - Tr) + hc'(Tsk - Ta) \quad [8]$$

And comparing said expression [1] with said expression [8] establishes the following relationship:

$$hgr = hr \quad [9]$$

$$hgc = hc' \quad [10]$$

$$M = Hsk/Fcl \quad [11]$$

then, the surface temperature of said heating element, Tg is equal to the mean temperature of the human skin, Tsk, which results in:

$$Tg = Tsk \quad [12]$$

(hereinafter, the surface temperature of said heating element with characteristics meeting said expressions [9] to [11] is expressed as KET*).

Furthermore, regading said SET*, evaporative heat loss is included in heat loss by convection, and then said expression [6] results in:

$$Hsk = hs' \cdot Fcls(Tsk - SET^*) \quad [13]$$

(whereas, hs': the total heat transfer coefficient of the human body by convection, evaporation, and radiation in a standard air flow).

And said expressions [12] and [13] results in:

$$SET^* = KET^* - Hsk/(Fcls \cdot hs') \quad [14],$$

and when calculating in the range of comfortable temperatures, the 2nd term of the right side in said expression [14] can be regarded to be constant.

Accordingly, by measuring the surface temperature, KET* of said heating element with the characteristics of heat transfer which meet the conditions of the expressions [9] [11], SET* can be calculated approximately and the thermal estimation can be executed strictly under the actual residential environment by said thermal-environment sensor.

Therefore, the 1st purpose of this invention is to detect the actual thermal environment in a room with high accuracy, closely approximating the detecting characteristics of a thermal-environment sensor to actual bodily sensations by specifying the characteristics of radiation and absorption of the surface of a heating element with spectral emissivity—which is the function of wavelength-so as to correspond to the extraneous incidence spectrum, so that said expression [9] can be satisfied. In other words, so the radiant heat transfer coefficient of the surface of said thermal-environment sensor, hgr can conform to that of the human body, hr.

And in said conventional sensor equipped with a heating element having an electric heater in an empty shell, decreasing the supplied electric quantity by shortening the diameter of the shell (the heating element) increases the error between the actual effective temperature and the output value of said thermal-environment sensor, which defeats the essential function of the thermal-environment sensor to establish a thermal correlation with the human body. The concrete explanation of this is as follows:

the error between SET* (the index adopted by the American Society of Heating-Refrigerating and Air-conditioning Engineers, ASHRAE in the U.S.A.; the new standard effective temperature which has a close relationship with the sense of warmth or coldness, and comfort of the human body) and KET* (the output temperature of said thermal-environment sensor) is increased by shortening the diameter of said heating element as illustrated in FIGS. 2 and 3. That is, FIG. 2 illustrates the mean square value of the difference between SET* and KET* as S regarding the diameter of the spherical shell, D in the case that the speed of the air flow varies between 0.1 m/s and 1.0 m/s. FIG. 3 illustrates the mean square value of the difference between SET* and KET* as S regarding the diameter of spherical shell, D in the case that the difference between the mean radiation temperature and the temperature of the air varies between 0° C. and 10° C. Therefore, by FIGS. 2 and 3, it becomes clear that the error, S increases as the diameter, D becomes smaller than 100 mm, and that the lowest limit is about 60 mm as the range of the allowable error.

From this viewpoint, it is desirable to detect the thermal conditions at the place where the person is, by putting said thermal-environment sensor near the human body in order to keep a room in a comfortable thermal condition for the human body. But nevertheless, in the above-mentioned case, this requirement cannot be satisfied, because the diameter of the shell cannot be shortened under the predetermined value, and moreover, the large quantity of the supplied electric power requires a supplied electric cord from a commercial electric source, which cannot allow said thermal-environment sensor to be carried freely, so the field of movement is limited. In addition, there exists the practical inconvenience of tripping over said supplied electric cord.

For this reason, the 2nd purpose of this invention is to be able to detect the thermal environment near the human body precisely by the following method:

the composition of said thermal-environment sensor is reformed as follows: that is, the electric heater is installed in part of the heat insulator; and in this way, the newly devised sensor becomes a partial heated sensor, while the conventional one is a whole heated one; by means of this partial heated sensor, the effective temperature considering the temperature of the air, the speed of the air flow, and the radiation can be detected: therefore, this makes it possible to decrease the quantity of electricity and to supply said heater with electric power from an electric battery without an electric cord from a commercial electric source.

In addition, the conventional type considers only the dry heat loss from the human body by radiation and convection, and does not include evaporative heat loss which is caused by perspiration, etc. Therefore, it is difficult to detect thermal conditions in an actual residential environment as precisely as bodily sensations.

For this reason, the 3rd purpose of this invention is to detect more precisely actual thermal conditions in a room by considering heat loss due to perspiration of the human body and by keeping the size of said heating element and the supplied thermal quantity within the most reasonable range to satisfy the condition of evaporative heat loss so as to approximate said thermal-environment sensor to the actual sensations of the human body more precisely.

And the expression of thermal equilibrium regarding said thermal-environment sensor is said expression [1] as above-mentioned, and by this expression, thermal conditions in an indoor environment are determined; in this theory, the condition of equability of the heat flux becomes the premise thereof. While, in the case of said conventional type, there is a problem that the precision thereof is low because the condition of equability of the heat flux is not sufficiently satisfied, since the electric heater is simply placed near the center of the inside of the empty shell and only the upper part of the shell is heated mainly by convective heat transfer as above-mentioned.

The 4th purpose of this invention is to seek improvement in the precision of thermal detecting, by satisfying the conditions of the equability of heat flux that is the premise of the theory of said thermal-environment sensor as much as possible by heating the whole shell equally during the heat transfer from said electric heater to said shell.

And the 5th purpose of this invention is to control the thermal environment precisely by reckoning with all the factors of the thermal environment by detecting the effective temperature considering the humidity as well as the temperature of the air, the speed of the air flow, and the radiation, since the actual thermal environment cannot be otherwise grasped precisely, and the effective temperature depends on the variation of the humidity, even though the temperature, the speed of the air flow and the radiation in a room are under the same conditions.

Moveover, the effective temperature depends on the variation of the quantity of clothes of the users, such as the variation of clothes due to the seasons (for example, summer clothes and winter clothes) and due to whethter or not bedclothes are used on the bed, even though the thermal environment is the same in terms of the temperature of the air, the speed of the air flow, and the radiation, etc.

In other words, the 6th purpose of this invention is to grasp precisely control the actual effective temperature adjusted to the quantity of clothes of the users by detecting the effective temperature reckoning with the quantity of the clothes of the users in addition to the temperature of the air, the speed of the air flow, and the radiation including the humidity in the environment of a room.

In addition, it is known that a sense of draft is caused in heating a room when the speed of the air flow in the room is in excess of a certain value; therefore, it is necessary that the properties of the air flow blowing from the air-conditioning system are controlled. It should be noted that the conventional type does not have the capacity to detect each physical quantity individually, such as the speed of the air flow and the mean radiation temperature, etc., because said conventional type detects the effective temperature simply reckoning with heat loss by radiation, convection, and evaporation of water from the human body; therefore, it is difficult to control the air-conditioning system in the optimum way by detecting directly the speed of the air flow and a sense of draft near the human body.

For this reason, the 7th purpose of this invention is to detect the speed of the air flow and the mean radiation temperature which are important in controlling the thermal environment in a room, while detecting the effective temperature reckoning with heat loss by radiation, convection, and evaporative heat loss from the human body.

(DISCLOSURE OF THIS INVENTION)

This invention relates to a thermal-environment sensor described as below.

For the 1st purpose as explained above, thermal-environment sensor is equipped with a heating element heated by a supply of thermal quantity which is positioned in a room; and with a temperature detector which detects the surface temperature of said heating element, Tg. Then, on the basis of the surface temperature of said heating element, Tg detected by said temperature detector, the thermal conditions including air temperature, air velocity and mean radiant temperature in the room are detected. In addition, the outer surface of said heating element is covered by a layer of radiant materials with such spectral emissivity as closely conforms to that of the human skin or clothes thereon. In this way, in the case of solar radiation, the thermal characteristics of said sensor correspond to those of the human body and both their radiant heat transter coefficients have a close correlation in which they approximate each other, because of the correspondence between the spectral emissivity of the outer surface of said heating element and that of the human body: so, thermal conditions where the human body feels comfortable can be detected with high accuracy by said sensor.

And for the 2nd purpose of this invention as above-mentioned, said heating element of said thermal-environment sensor is equipped with said electric heater in part of the insulator, and the surface temperature of said electric heater, Tg is detected by the temperature detector. Accordingly, said heating element has a similar heating organization to that of the human body; the heat value of said heating element per a unit surface area is equal to that of the human body. For this, in comparison with the conventional type sensor which heats the whole shell, the expression is as follows, whereas, the heat value per a unit surface area is expressed as M:

$$M = H_1/A_1 = H_2/A_2 \quad [15]$$

(whereas, M: the generated heat value per a unit surface area of the human body; $H_1$: the heat value of an electric heater of the conventional type of the thermal-environment sensor in which the whole shell is heated; $A_1$: the effective surface area of the conventional type of thermal-environment sensor in which the whole shell is heated; $A_2$: the heat value of the electric heater of the thermal-environment sensor in this invention; $A_2$: the effective surface area of the thermal-environment sensor of this invention, that is, the surface area of the electric heater).

And by this expression [15], the expression [16] is derived as follows:

$$H_2 = (A_2/A_1) \cdot H_1 \quad [16]$$

As confirmed in the expression [16], in said thermal-environment sensor of this invention, the heat value of the electric heater, $H_2$ decreases in proportion to $A_2/A_1$ that is the rate of the effective surface area; and the input electric power can also be decreased. Furthermore, by the adiabatic action of the heat insulator, the lost thermal quantity during thermal transfer to the heat insulator of the electric heater can be decreased more sharply: so it is possible to decrease the quantity of input electric power more. As a result, by this decrease of the input electric power, an electric cell such as a dry cell can be used as a source of electricity, that makes said thermal-environment sensor handy to carry easily and freely, so that the thermal environment surrounding the human body can be always detected precisely.

And, for the 3rd purpose as above-mentioned, and for the purpose of meeting the conditions of said expressions [10], [11], in this invention, the supplied thermal quantity, M to the heating element and the size thereof are determined to conform to the characteristics regarding the speed of the air flow and the mean radiant temperature of SET* reckoning with the evaporative heat loss under normal conditions and within a range of comfort; and to the characteristics of KET*, the surface temperature of said heating element; that is, to the characteristics of thermal equilibrium of the human body reckoning with evaporative heat loss.

In other words, provided that the state of the speed of the air flow equal to 0.1 m/s is defined as a standard state and the speed of the air flow varies from said standard state to 1.0 m/s, the mean square value, S of the difference between $^2$SET* and $^2$KET*, which is the value of each variation of SET* and KET* in accordance with the variation of the speed of the air flow is given by:

$$S = \overline{(\Delta SET^* - \Delta KET^*)^2} \quad [17].$$

And then, the size of the shell of the heating element is set at the variable value, and the supplied thermal quantity, M, by which said mean square value, S becomes minimum regarding each size, is given and this minimum of the mean square value, S is plotted according to each size; then, for example, in the case of a spherical shell, by putting the diameter, D on a horizontal axis, characteristics as illustrated in FIG. 4 are found. In this connection, the surface temperature of the heating element, Tg is calculated based on the expression [1]; the convective heat transfer coefficient of the heating element, hgc is calculated by such an empirical formula regarding the forced convective heat transfer coefficient as the expression [18] below-mentioned.

$$Nu = 2 + 0.645 Re^{0.505} \quad [18]$$

(whereas, Nu: Nusselt's number, Re: Reynold's number)

FIG. 5 illustrates the variation of the mean square value, S in the case that the supplied thermal quantity, M(Met=58.2W/m$^2$) varies and the diameter, D of the spherical shell is 100 mm; if the diameter, D is determined, the optimum supplied thermal quantity, M which is the minimum of the mean square value, S is determined. And FIG. 6 illustrates the variation of the optimum supplied thermal quantity, M, in the case that the diameter of the spherical shell varies. Therefore, by these FIGS. from FIG. 4 to FIG. 6, it is known that it is necessary to determine the supplied thermal quantity, M and the diameter of the spherical shell, D specially in order to make the thermal-environment sensor more precise by lessening the mean square value.

The above-mentioned case is an example of determining the supplied thermal quantity, M in order to minimize the mean square value, S within the range of the speed of the air flow from 0.1 m/s to 1.0 m/s; when the diameter of the spherical shell is 60 mm, the supplied thermal quantity, M is 101 W/m$^2$. Meanwhile, on condition that in the case of the speed of the air flow equal to 0.1 m/s, KET* is equal to SET*, so if the supplied thermal quantity, M is determined to minimize S when the diameter of the spherical shell, D is 60 mm, the supplied thermal quantity is 86 W/m$^2$. The former way is to optimize by estimating equably the whole range of the speed of the air flow of 0.1 m/s to 1.0 m/s; but the latter way is to optimize so as to make KET* equal to SET* preferentially when the speed of the air flow is 0.1 m/s. It is appropriate to take the latter supplied thermal quantity value when the thermal-environment sensor is used in an environment where the speed of the air flow is around 0.1 m/s; it is also appropriate to take the former supplied thermal quantity value when the speed of the air flow varies within the wide range of 0.1 m/s to 1.0 m/s. This specification is described based on the former way.

In the same way as the above-mentioned, on condition that the state that the mean radiant temperature, Tr is equal to the temperature of the air, Ta(Tr=Ta) is defined as a standard state and when the value of the difference between Tr and Ta varies between −5° C. and +5° C., said mean square value, S which relates to $\Delta SET^*$ and $\Delta KET^*$, each varied value of SET* and KET* varied by the increased and decreased value of subtracting Ta from Tr, (Tr−Ta) is plotted regarding each diameter of the shell, D, then the characteristic as shown in FIG. 7 is found. In this connection, for the supplied thermal quantity to the heating element, M, the value that is determined in seeking the characteristics about said variation of the speed of the air flow is used (the optimum supplied thermal quantity, M regarding each diameter of the shell, D is shown in FIG. 6).

Therefore, in this invention, in the case of a spherical shell, based on the characteristics as shown in FIGS. 4 and 7, the diameter of the heating element, D is restricted, for example, to within a range of between 60 mm and 150 mm; regarding this range of the diameter of the shell, D, the supplied thermal quantity, M to the heating element is restricted within a range of between 76 W/m² and 150 W/m² so as to establish a very close correlation between $\Delta SET^*$ and $\Delta KET^*$ regarding each variation of the speed of the air flow and of the difference between the mean radiant temperature, Tr and the temperature of the air, Ta.

To explain the reason for this restriction, from FIG. 7, it is known that the mean square value, S increases remarkably as the diameter of the spherical shell decreases, so its efficiency as a thermal sensor decreases. Hence, when the mean radiation temperature, Tr varies, $\Delta KET^*$ is in direct proportion to Tr and also $\Delta SET^*$ is almost nearly in direct proportion to Tr: so according to the increase of Tr, $(\Delta SET^* - \Delta KET^*)$ increases. Then, regarding a variation of 1° C. in said mean radiation temperature, Tr, $(\Delta SET^* - \Delta KET^*)$ is allowed to be 0.1° C., and also, in FIG. 7, Tr varies from $-5°$ C. to $+5°$ C., therefore, the mean square value, S is S=0.1 from said expression [17]. And from FIG. 7, when S is within the range of S≦0.1, the diameter of the spherical shell is D≧60 mm. On the other hand, the minimum upper boundary of the diameter, D is 150 mm because it is easy to use and allows the thermal sensor to be small in size and volume. Hence, from FIG. 6, the optimum supplied thermal quantity, M corresponding to the diameter, D within the raqnge of D=60 mm to 150 mm is within the range of M=76 to 150(W/m²)=1.3 to 1.8(Met).

In addition, for the shape of the shell, not only a sphere but a column, an ellipsoid of revolution, etc. and other various shapes are available. And also, in the case of these other shapes, in the same way as above mentioned, the size of the heating element and the supplied thermal quantity, M can be specially restricted so as to conform to the characteristics in thermal equilibrium of the human body considering even evaporative heat loss: for example, in the case of a column-shaped shell, adopting the expression of Messrs. Igarashi and Hirata's as below-defined, which is concerned with the forced convection heat transfer of the column-shaped shell, the expression is:

$$Nu = 0.373Re^{\frac{1}{2}} + 0.05Re^{\frac{2}{3}} \quad [19],$$

in the same way as said spherical shell, regarding the diameter of said column, D, the mean square value, S which is calculated by said expression [17], is plotted: so, the variation and the characteristics concerning each speed of the air flow and each mean radiant temperature are expressed in FIGS. 8 and 9; and in this case, it is known that it is preferable that the diameter, D is greater than 80 mm. In addition, it is also known that the optimum supplied thermal quantity, M in this case is greater than 76 W/m².

Hence, the thermal equilibrium of the thermal sensor can establish a closely approximate correlation with that of the human body so that the thermal condition in which the human body feels comfortable can be detected with high precision by only one sensor. Moreover, it is possible to shorten the size of said heating element because even evaporative heat loss is considered in setting the size of the heating element and the supplied thermal quantity, M so as to correspond to the characteristics of thermal equilibrium of the human body. FIG. 10 illustrates the convective heat transfer coefficient, hgc regarding the diameter, D of said shell in the thermal-environment sensor having a spherical heating element or a column-shaped heating element, etc., and also illustrates the level of the convective heat transfer coefficient in the human body, hc and of the convective heat transfer coefficient, hc' considering even evaporative heat loss defined in said expression [7]. As illustrated in said FIG., due to the characteristics that the convective heat transfer coefficient, hgc decreases as the diameter, D increases, the diameter, $D_B$ which is determined to conform hc' to hgc is shorter than the diameter, $D_A$ which is determined to conform hc to hgc; so that shortening the size is possible.

Moreover, for the 4th purpose aforesaid, in this invention, said heating element in said thermal-environment sensor is provided with a panel-shaped electric heater on the surface of the shell in the pattern where said shell is in the state of equability of the heat flux; or is provided with the means for heat transfer by which heat from the electric heater is transferred to said shell equally so that the heat flux of said shell is invariable. Hence, the condition of equability of the heat flux is satisfied, which is the premise of the theory of said thermal-environment sensor.

In addition, for the 5th purpose aforesaid, this invention comprises said heating element put in a room; also, a temperature detector which detects the surface temperature, Tg of said heating element; a humidity detector which detects the humidity in the room, RH; a means for operating which, inputting the output of both of the above detectors, calculates the effective temperature, y in an indoor environment corresponding to the temperature of the air, the speed of the air flow, the radiation, and the humidity based on the surface temperature of said heating element, Tg and the humidity in the room, RH. Hence, the effective temperature corresponding to the temperature of the air, the speed of the air flow, the radiation, and the humidity in a room is detected based on the surface temperature of said heating element, Tg and the humidity, RH. Moreover, in the case that the supplied thermal quantity to the heating element is M, the expression of thermal equilibrium is said expression [1]; hence, the surface temperature of the heating element, Tg is a function of the temperature of the air, the speed of the air flow, and the radiation; because hgc in said expression [1] is a function of the speed of the air flow. And considering the humidity, RH as well as the surface temperature of said heating element, Tg, the effective temperature, y is calculated by the expression of $y = f(Tg, RH)$: so this is the effective temperature considering the temperature of the air, the speed of the air flow, the radiation, and also the humidity. Hence, even in a residential environment where the temperature of the air, the speed of the air flow, the radiation, and the humidity vary, the variation of the effective temperature due to the above variations thereof can be detected precisely.

And for the 6th purpose, this invention comprises said heating element placed in a room; also a temperature detector which detects the surface temperature of said heating element, Tg; a setting device for the quantity of clothes which sets thermal resistance, Clo corresponding to the quantity of clothes on the human body; a means for calculating which calculates the effective temperature, y in a room corresponding to the temperature of the air, the speed of the air flow, the radiation, and the quantity of clothes on the human body, based on the surface temperature of the heating element, Tg and the thermal resistance of the quantity of clothes, Clo given by inputting the output of said temperature detector and said setting device for the quantity of clothes.

Hence, the effective temperature corresponding to the temperature of the air, the speed of the air flow, the radiation, and the quantity of clothes on human body in the room can be detected based on the surface temperature, Tg and the thermal resistance, Clo which is set so as to correspond to the quantity of clothes on the human body. That is, the effective temperature considering the temperature of the air, the speed of the air flow, the radiation, and the quantity of clothes can be detected; because as mentioned above, the surface temperature of the heating element, Tg is a function of the temperature of the air, the speed of the air flow, and the radiation; also, because the effective temperature, y is calculated by the expression of $y=f(Tg, Clo)$, considering the thermal resistance of the quantity of clothes, Clo, as well as the surface temperature of the heating element. Hence, in the case where an air-conditioning system is controlled by using said effective temperature, a comfortable thermal environment can be maintained without need to vary the set comfortable temperature only by setting the thermal resistance, Clo corresponding to the quantity of clothes with the setting device for the quantity of clothes (9).

And for the 7th purpose, in this invention, said thermal-environment sensor is provided with the means for a variable electric source to vary the supplied thermal quantity, M to the heating element (or the electric heater therein). And the speed of the air flow is calculated based on the difference between the surface temperature of said heating element, $\Delta Tg$ before and after the variation of the supplied thermal quantity, M by the means for the variable electric source. In addition, the speed of the air flow and the mean radiant temperature are calculated based on the difference between the surface temperatures of said heating element, $\Delta Tg$ and the temperature in the room, Ta.

Here, the way to measure the speed of the air flow and the mean radiant temperature by varying the supplied thermal quantity to said heating element, M and detecting the difference, $\Delta Tg$ of the surface temperature of said heating element, Tg is described in detail.

That is, in the case of the supplied thermal quantity, $M_1$ in the thermal-environment sensor, the expression of thermal equilibrium is defined from said expression [1] as follows:

$$M_1 = hgr \cdot (Tg_1 - Tr) + hgc \cdot (Tg_1 - Ta) \qquad [20]$$

(whereas, Tr: the mean radiant temperature in the room; Ta: the temperature of the air; hgr: the radiant heat transfer coefficient of the heating element; hgc: convective heat transfer coefficient of the heating element).

In the same way, in the case of the supplied thermal quantity, $M_2$, if the thermal environment is the same as in the case of said supplied thermal quantity, $M_1$, the expression regarding thermal equilibrium is defined as follows:

$$M_2 = hgr \cdot (Tg_2 - Tr) + hgc \cdot (Tg_2 - Ta) \qquad [21]$$

And by subtracting expression [21] from expression [20], the convective heat transfer coefficient, hgc of the heating element is calculated from the following expression of:

$$hgc = (M_1 - M_2)/(Tg_1 - Tg_2) - hgr \qquad [22]$$

In expression [22], since it is considered that $M_1 - M_2$ is the supplied thermal quantity set in advance and that hgr is the constant of 5.0[kcal/m2 hr°C.] in an ordinary indoor environment, hgc can be calculated only by measuring $Tg_1 - Tg_2 (=\Delta Tg)$. On the other hand, the expression regarding the transfer coefficient of the forced convection heat of the thermal-environment sensor is given by said expression [18], whereas, here Nu and Re are defined as follows:

$$Nu = hgc \cdot D/\lambda$$

$$Re = U \cdot D/\nu$$

(whereas, D: the diameter of a spherical shell; $\lambda$: the thermal conductivity of the air; U: the speed of the air flow; $\nu$: the dynamic coefficient of the viscosity of the air), and the speed of the air flow, U is given by:

$$U = \nu/D \cdot [(hgc \cdot D/\lambda - 2)/0.645]^{1.98} \qquad [23]$$

In said expression [23], D is already known and also $\nu$, $\lambda$ are already known as the values of the physical properties of air. Therefore, the speed of the air flow, U can be given by expressions [22], and [23] from measuring $Tg_1 - Tg_2 (=\Delta Tg)$. Moreover, by detecting the temperature in a room, Ta, the mean radiant temperature, Tr can be given by:

$$Tr = \{hgc(Tg_1 - Ta) + hgr \cdot Tg_1 - M\}/hgr \qquad [24]$$

Hence, the speed of the air flow, U and the mean radiant temperature, Tr can be detected by varying the supplied thermal quantity to the heating element, M by the means for a variable electric source.

(BRIEF DESCRIPTION OF DRAWINGS)

Also.

FIG. 25 shows the cross section of the thermal-environment sensor, the 6th embodiment of this invention.

FIG. 26 shows the front view of the surface of the 6th embodiment in a state without the layer of radiant materials.

FIG. 27 shows the enlarged view of the essential parts of FIG. 25.

FIG. 28 shows the illustration of the result of measuring, illustrating the distribution of the temperature of the electric heater and the fringe thereof in this embodiment compared with certain examples.

FIG. 29 is an outline, in the state of heat balance of the electric heater.

FIGS. 30 and 31 each show an outline of the perspective view of the spherical shell and the column-shaped shell, in the case of being provided with two electric heaters.

FIG. 32 shows a characteristic illustrating the relationship with the variation range of the surface temperature of the shell regarding a phase angle between two electric heaters.

FIG. 33 shows the cross section of the thermal-environment sensor, the 7th embodiment of this invention.

FIG. 34 shows the front view of the surface in a state without the layer of radiant materials thereon.

(DETAILED DESCRIPTION OF PREFERRED EMBODIMENT)

To explain this invention in detail, this is described according to the attached drawings as below.

Figure 1:
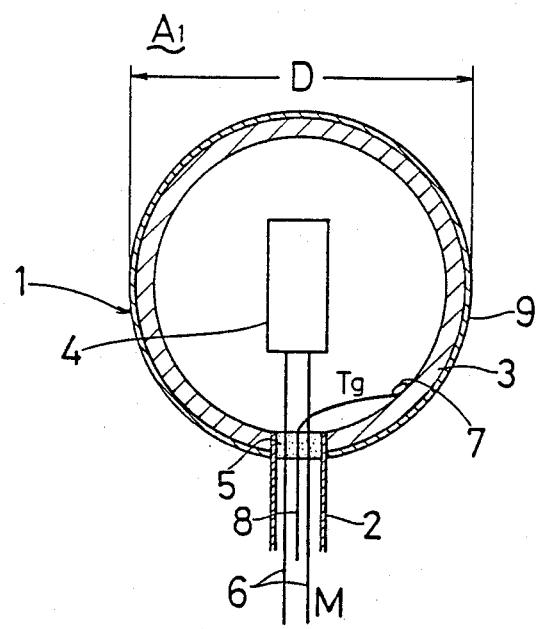
FIG. 1 shows the cross section of a thermal-environment sensor, the 1st embodiment of this invention.
Figure 10:
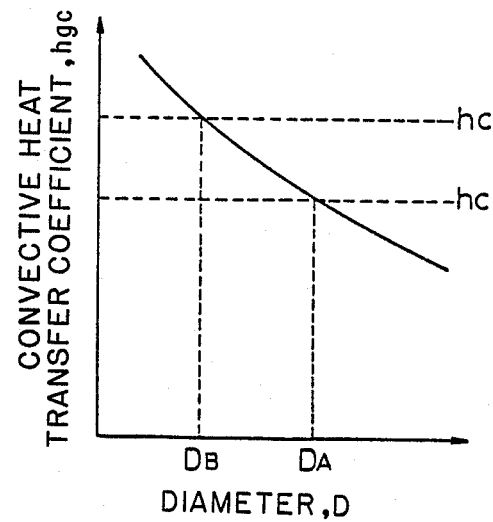
FIG. 10 shows the characteristics of the convective heat transfer coefficient regarding the diameter of the shell.

FIG. 1 shows a thermal-environment sensor ($A_1$) for the use of controlling an air-conditioning system concerning the 1st embodiment to be the base of this invention; (1) is a heating element of a spherical shell, wherein an electric heater (4) is enclosed in the center of an empty spherical shell (3) made of a metal with high heat conductivity such as copper, aluminum, etc. in which a supporting pipe-pole (2) is pierced and fixed. Said electric heater is connected with a supply electric power cord (6), (6) supplying said electric heater with supply electric power, and piercing an electric insulator (5) packed into said supporting pipe-pole (2), and by said supply electric power cord (6), (6), the electric heater (4) is fixed and supported in the shell (3).

In addition, to the inside surface of the shell of said heating element, a thermocouple (7) is adhered as a temperature detector which detects the temperature, Tg of the surface of the heating element (1) (the shell (3)); the output cord (8) of said thermocouple (7) is guided to the outside of the shell (3) through said insulator (5) and said supporting pole (2), which supplies said heating element (1) with a thermal quantity heating the electric heater (4) by passing an electric current; in that state, the surface temperature, Tg of the heating element (1) is detected by the output voltage of the thermocouple (7), and based on this, Tg, the thermal conditions in the room can be detected as the effective temperature considering heat loss by radiation, convection, and evaporative heat loss from the human body.

Moreover, the outer surface of the shell (3) of said heating element (1) is covered by a filmy layer of radiant materials (9) with spectral emissivity closely conforming to the spectral emissivity of the surface of the human skin or the clothes thereon.

Said layer of radiant materials (9) is made of burned materials of a mixture of a metallic oxide as a pigment and a binder of synthetic resins, etc., wherein the thickness of the film is $20\mu$ to $40\mu$. Titanium dioxide($TiO_2$), manganese dioxide($MnO_2$), aluminum oxide($Al_2O_3$), nickel oxide(NiO), cobalt oxide(CoO), chrome oxide(Cr$_2$O$_3$), etc. are available for said metallic oxide. And acrylic resin, melamine resin, polyester resin, epoxy resin, fluoric resin, and silicone resin are available for a binder; regarding the the heat resisting property, fluorine resins such as tetrafluoroethylene resin(PTFE), etc., and silicone resins are preferable. Especially, radiant materials made of titanium dioxide and tetrafluoroethylene resin are suitable due to their characteristics of spectral emission which conforms favorably to the characteristics of spectral absorption of the human body; in this case, a mixture of titanium dioxide equal to from 20% by weight to 50% by weight is preferable from the point of radiant capacity within the range of far-infrared radiation, the intensity of the film, and the mean dispersion of the grains of titanium dioxide. Therefore, the rate of combination of titanium dioxide is set at within a range between 20% by weight and 50% by weight, because in the case of more than 60% by weight, the emissivity of the range of far-infrared radiation is low; and in the case of less than 20% by weight, the capacity of dispersion of titanium dioxide is low.

In addition, to satisfy the conditions of the expressions, [10], [11] described in the background of the art as above-mentioned, the supplied thermal quantity, M to the heating element (1) and the diameter, D thereof are set so as to conform the characteristic regarding the speed of the air flow and the mean radiant temperature of SET* considering evaporative heat loss in a normal state, within the range of comfortableness, to the characteristics of KET*, the surface temperature of said heating element; in other words, so as to equal the characteristics of thermal equilibrium of the human body considering even evaporation heat loss.

Figure 2:
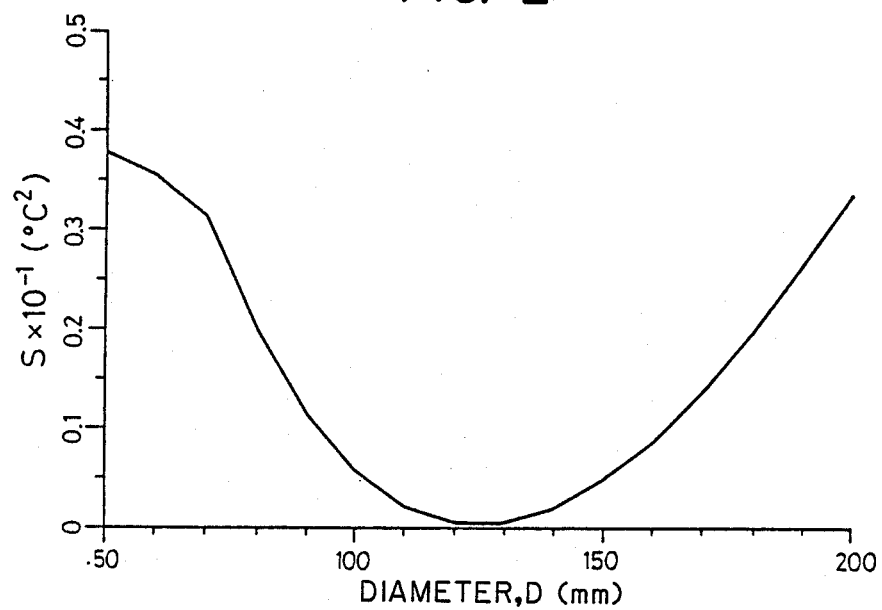
FIG. 2 shows the characteristics to restrict specially the optimum range of the diameter of a heating element of a sphere-shaped shell type concerning the speed of the air flow.

That is, the state of the speed of the air flow equal to 0.1 m/s is prescribed as the standard state; then, in varying the speed of the air flow to 1.0 m/s from the standard state, the mean square value, S of the difference between ΔSET* and ΔKET*—which are the varied values of SET* and KET* accompanied with the variation of the speed of the air flow—is given by said expression [17]; then, after setting the diameter, D of the shell (3) of the heating element (1) at each value, the supplied thermal quantity, M—which minimizes said mean square value, S regarding each diameter, D—is given; then, that mean square value, S is plotted regarding each diameter, D: so, the characteristic illustrated in FIG. 2 is given. In that time, the surface temperature, Tg of the heating element (1) is given based on the expression [1]; and the convective heat transfer coefficient, hgc of the heating element (1) is given by using the following expression [25] of Yuge's regarding the forced convective heat transfer coefficient of the sphere:

$$Nu = 2 + 0.3 Re^{0.556} \quad [25]$$

(whereas, Nu: Nusselt's number, Re: Reynold's number).

Figure 3:
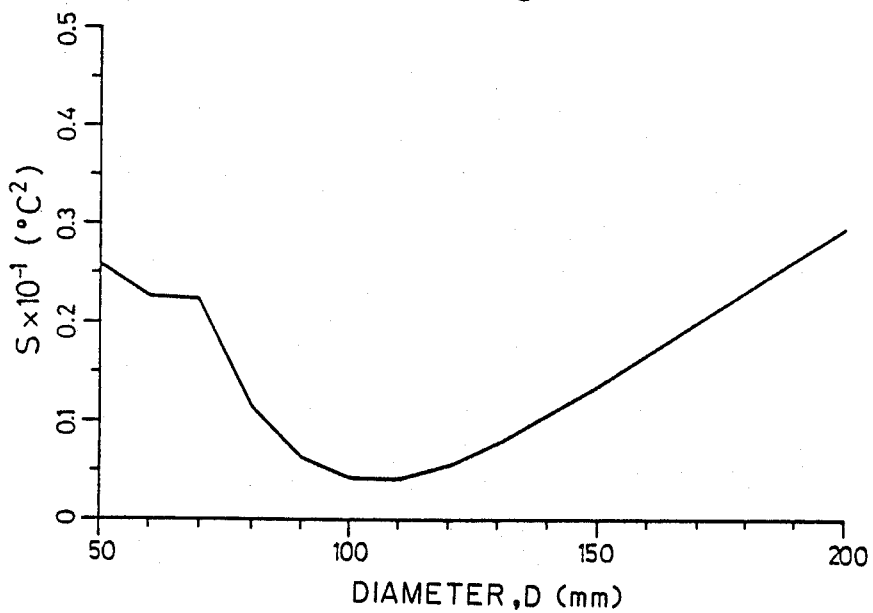
FIG. 3 shows the characteristics to restrict specially the optimum range of the diameter of a heating element of a sphere-shaped shell type concerning the difference between the mean radiant temperature and the temperature of the air.
Figure 4:
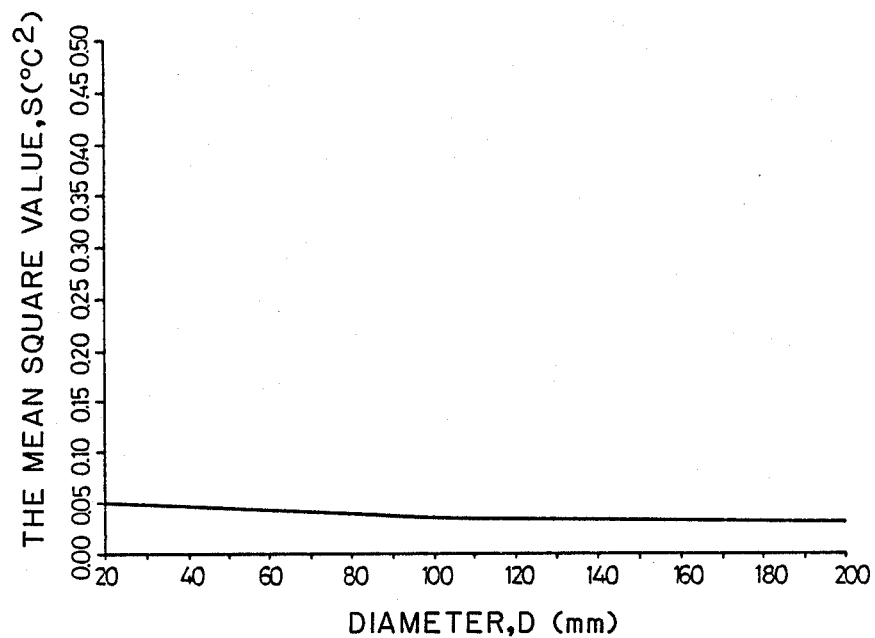
FIG. 4 shows the characteristics of the mean minimum value for the diameter in the case of the heating element of a sphere-shaped shell type.
Figure 5:
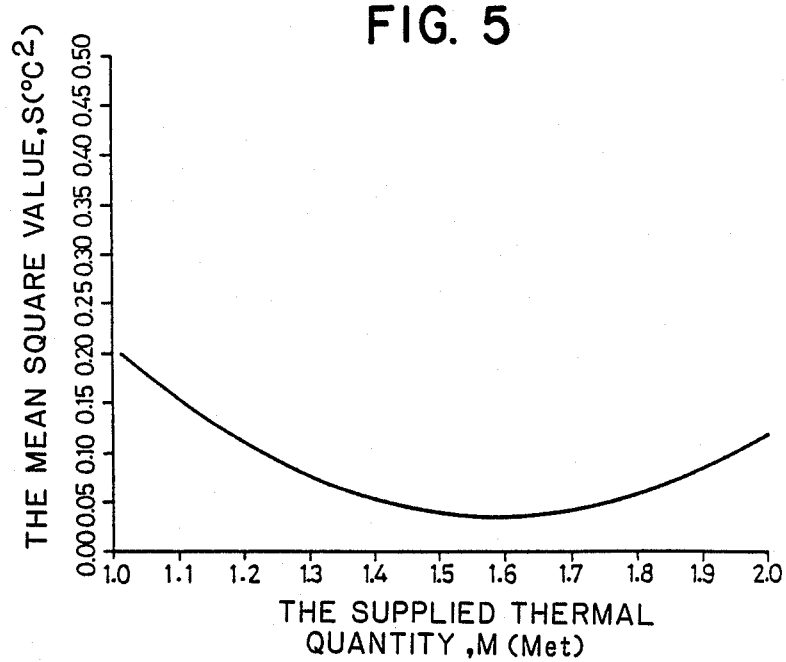
FIG. 5 shows the characteristics of the variation of the mean square value regarding the supplied thermal quantity, in the case that the diameter of the heating element is 100 mm.
Figure 6:
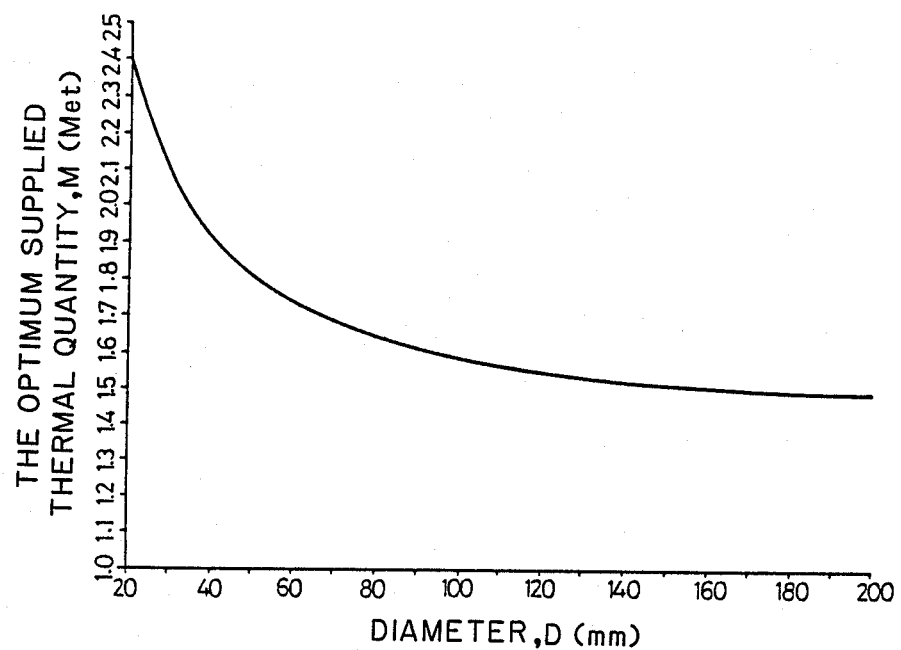
FIG. 6 shows the characteristics of the variation of the optimum supplied thermal quantity regarding the diameter of the heating element.
Figure 7:
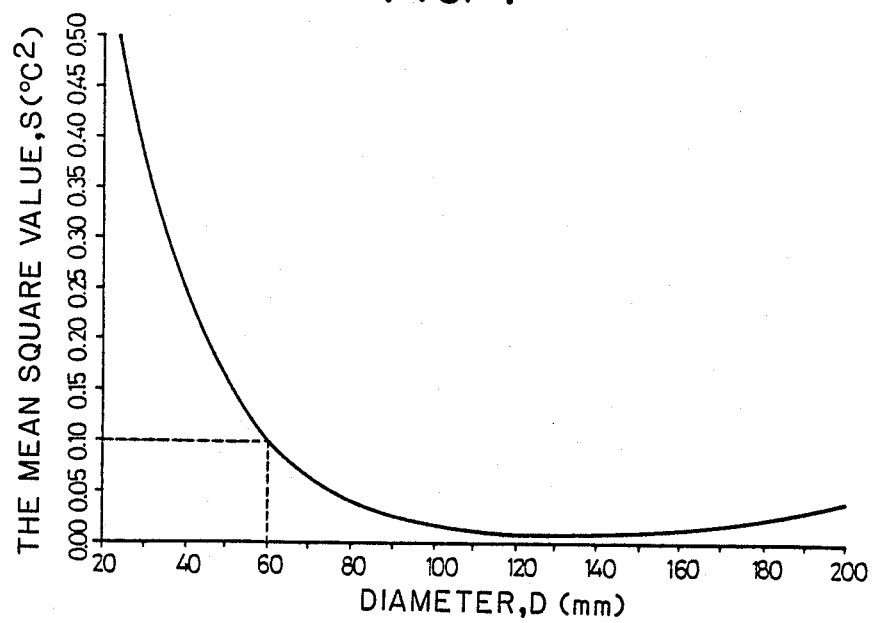
FIG. 7 shows the characteristics of the mean square value regarding the increase and decrease of the difference between the mean radiant temperature and the temperature of the air.
Figure 8:
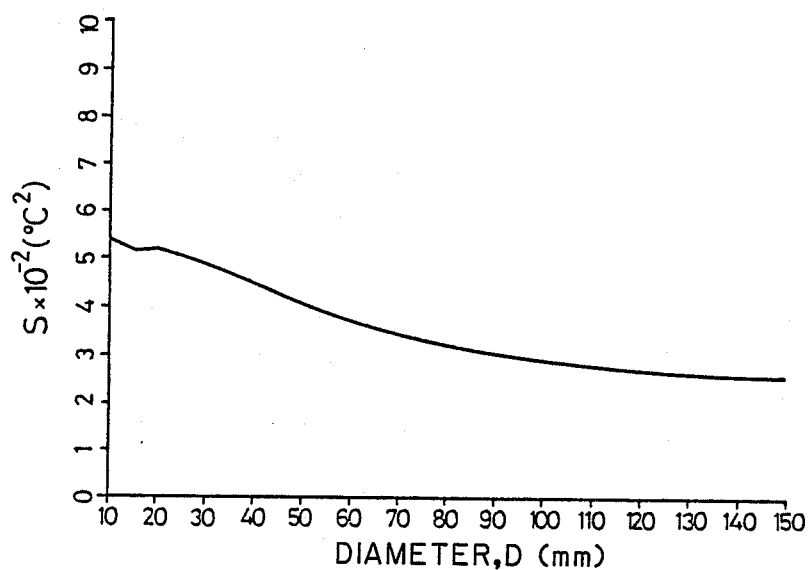
FIG. 8 and 9 show the characteristics of the variation of the mean square value concerning the speed of the air flow and the mean radiant temperature regarding the diameter, in the case of a column-shaped shell.
Figure 9:
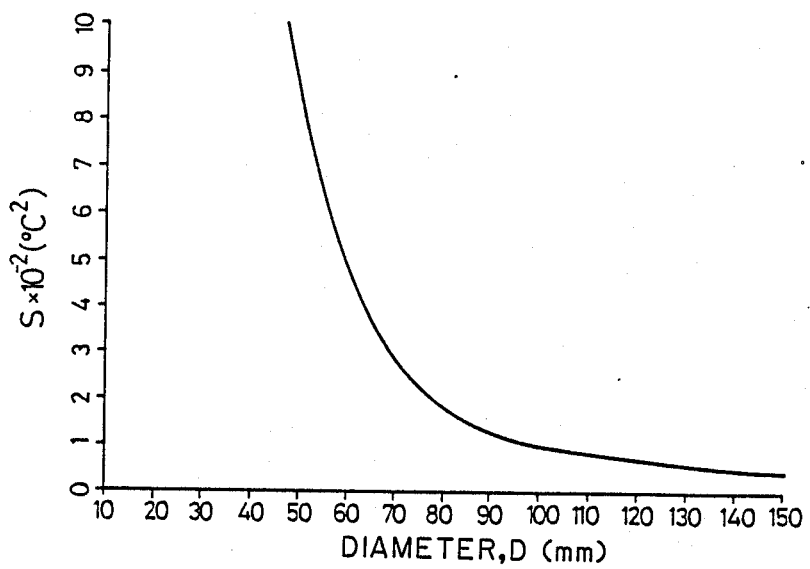

Furthermore, in the same way as the above, the state where the mean radiant temperature, Tr equals the temperature of the air, Ta(Tr=Ta) is prescribed as the standard state; and in varying Tr−Ta from the standard state to 10° C., the mean value, S concerning each varied value of SET* and KET*, that is, ΔSET* and ΔKET* accompanied with the increasing variation of (Tr−Ta) is plotted regarding each diameter, D: and then, the characteristic as illustrated in FIG. 3 is given.

For the supplied thermal quantity, M to the heating element (1), the value determined in getting the characteristics concerning said variation of the speed of the air flow is used. And the diameter, D of the shell (3) of the heating element (1) is set at a range of D=60 mm to 150 mm, or better at a range of D=100 mm to 140 mm; also, regarding the range of the diameter, D, the supplied thermal quantity, M (electric input to the heater (4)) to the heating element (1) is set at a range of M=76 W/m$^2$ to 105 W/m$^2$, or better at a range of M=76 W/m$^2$ to 93 W/m$^2$ so as to establish a very close correlation between ΔSET* and ΔKET* concerning each variation of the speed of the air flow and of the difference between the mean radiation temperature, Tr and the temperature of the air, Ta, based on the characteristics as illustrated in FIGS. 2 and 3.

Therefore, in said 1st embodiment, since the spectral emissivity of the outer surface of the shell (3) closely conforms to the spectral emissivity of the human skin or clothes thereon due to the layer of radiant materials (8) formed over the outer surface of the shell (3) of the heating element (1), the radiant heat transfer coefficient, hgr of the surface of the heating element (1) can conform to the radiant heat transfer coefficient of the human body, hr precisely; and by said thermal-environment sensor (A$_1$), thermal conditions in an actual residential environment can be detected precisely.

Furthermore, the diameter, D of the shell (3) of the heating element (1) and the supplied thermal quantity, M to the heating element (1) is settled so as to equal the characteristics of thermal equilibrium of the human body considering even evaporative heat loss, and the convective heat transfer coefficient, hgc of the heating element (1) conforms to the convective heat transfer coefficient, hc' considering evaporation from the human body; furthermore, the supplied thermal quantity, M to the heating element (1) conforms to the value in which thermal loss, Hsk from the surface of the human skin divided by the thermal resistance coefficient, Fcl results: so, the thermal equilibrium of the thermal-environment sensor (A$_1$) can approximate very remarkably that of the human body; and SET* which is the actual thermal environment can be detected more precisely by detecting KET* with the thermal-environment sensor (A$_1$) based on the above reason.

Furthermore, regarding the thermal equilibrium of the human body, the convective heat transfer coefficient, hc' considering evaporation is settled and said convective heat transfer coefficient, hc' conforms to the convective heat transfer coefficient, hgc of the heating element (1): so, the diameter, D of the heating element (1) can be reduced without using a cover for the heating element which covers the surface of the heating element (1) and transfers radiant heat to the heating element (1) and also restrains convection.

In this connection, in said embodiment, the shell (3) composing the heating element (1) is an empty spherical chell, but the other empty shell shapes such as a column-shaped and ellipsoid-of-revolution-shaped, etc. are available.

Figure 11:
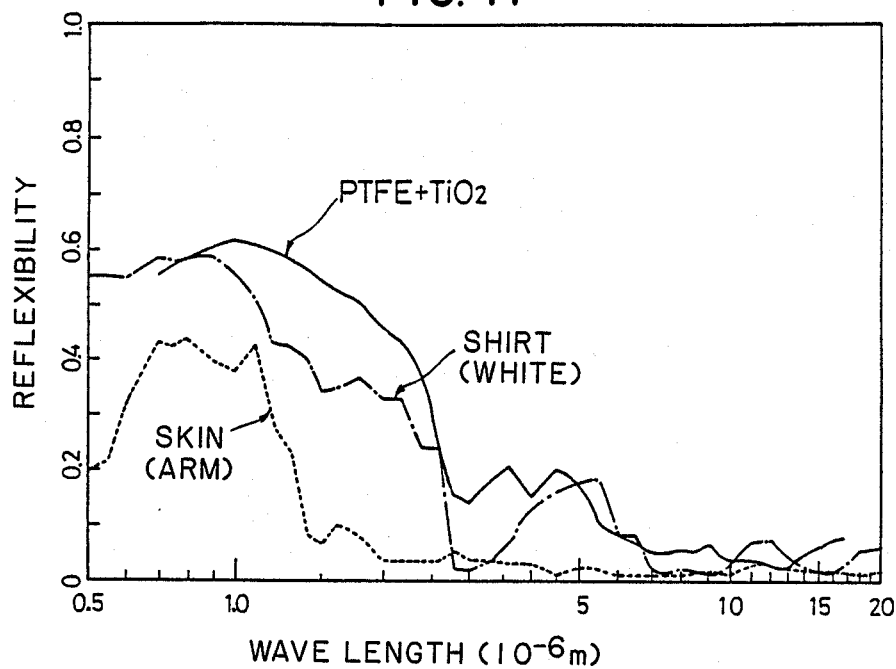
FIG. 11 shows the characteristics which illustrate the relationship with reflexibility regarding wave length in the layer of radiant materials.

Next, the concrete examples thereof will be described. In the thermal-environment sensor with the composition of said embodiment, in the case of using the mixture of 70% by weight of tetrafluoroethylene(PTEF) and 30% by weight of titanium dioxide(TiO$_2$) for the layer of radiant materials formed over the surface of the heating element, the characteristic of reflectivity (in the case of not transmitting, emissivity is given by (1—reflectivity)) for each wave length to the layer of materials is illustrated by a full line in FIG. 11. On the other hand, a broken line and a chain line in FIG. 11, each illustrates the characteristic of reflectivity of the surface of the arm skin of the human body and that of a white underskirt. From FIG. 11, it is known that if the layer of radiant materials which has the composition as illustrated above is used, the characteristics of spectral emissivity of the surface of the heating element of the thermal-environment sensor in this invention can closely conform to those of the surface of the human skin or the skirt quantitatively and qualitatively; so, the thermal-environment sensor in this invention can be embodied substantially.

Figure 12:
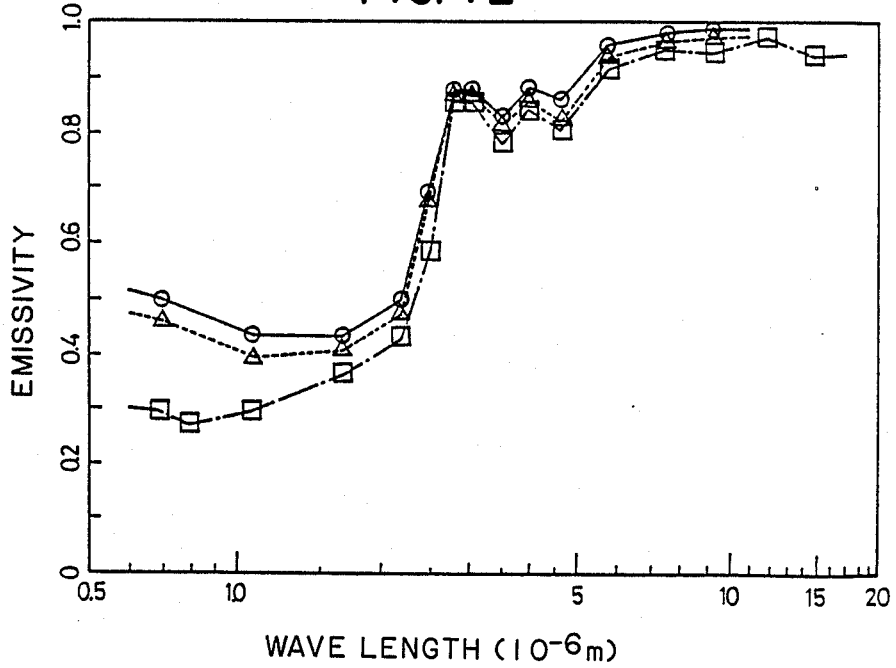
FIG. 12 shows the characteristics which illustrate the relationship with emissivity regarding wave length in the case of varying the rate of the composition of titanous oxide included in the layer of radiant materials.

In addition, in the case of varying said rate of mixture of titanous oxide to 30% by weight, 40% by weight, and 50% by weight and determning the thickness of the film as 30, the result of measuring the characteristics of spectral emissivity of each layer of radiant materials is illustrated in FIG. 12. In FIG. 12, a full line shows the case of 30% by weight, a broken line shows the case of 40% by weight, a chain line shows the case of 50% by weight. And from FIG. 12, it is known that at the point each wave length is 2.5 $\mu$m, there exists a cut-off value; and when each wavelength is below 2.5 $\mu$m, emissivity is low between 0.3 and 0.6; and in the range each wavelength is above 2.5 $\mu$m and within the range of high wavelength of far-infrared rays, emissivity is high between 0.8 and 0.9. On the other hand, in the range the wavelength is above 1.4 $\mu$m, the characteristics of spectral absorption of the human body have a high spectral absorptivity above 0.9. Hence, it is known that said layer of radiant materials has characteristics of spectral radiation which closely conform to the characteristics of spectral absorption of the human body.

Figure 13:
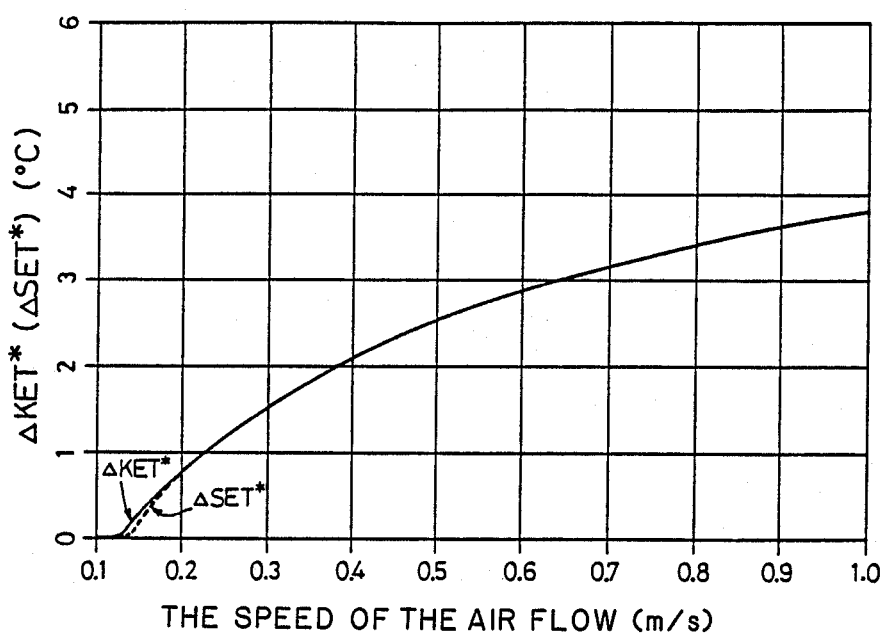
FIGS. 13 and 14 each show the characteristics which, compared with $\Delta SET^*$, illustrate $\Delta KET^*$ regarding the speed of the air flow and the difference between the mean radiant temperature and the temperature of the air, in the case of restricting specially each diameter of the heating element and each supplied thermal quantity, to the predetermined value.
Figure 14:
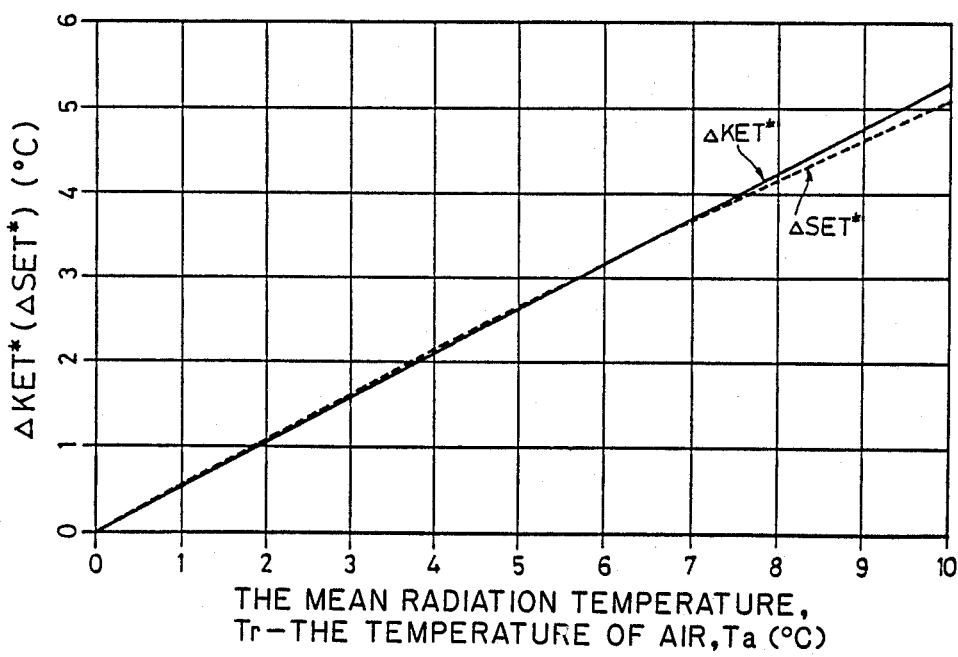

Furthermore, provided that the diameter, D of said heating element is set at 120 mm and the supplied thermal quantity, M at 83.2 W/m$^2$ (1.43 Met); and provided that in said thermal-environment sensor, in the case that the speed of the air flow is varied within a range of between 0.1 m/s and 1.0 m/s, the varied value of KET*, $\Delta$KET* from the standard state (when the speed of the air flow is 0.1 m/s) is calcurated; then, the characteristics as illustrated by a full line in FIG. 13 are given. The broken line in FIG. 12 illustrates the characteristics of the varied vlaue of SET*, $\Delta$SET* under the same conditions as the above. And, provided that in the same thermal-environment sensor as the above, the difference, (Tr−Ta) between the mean radiant temperature, Tr and the temperature of the air, Ta in a room is varied within a range between 0° C. and 10° C.; the characteristic of said $\Delta$KET* which varies from the standard state (when Tr equals Ta) is illustrated by a full line in FIG. 14. In this FIG. 14, a broken line illustrates the characteristics of $\Delta$SET*. So, it is known from FIGS. 13 and 14 that in the thermal-environment sensor of said embodiment, regarding each variation of the speed of the air flow and the difference, (Tr−Ta) between the mean radiant temperature, Tr and the temperature of the air, Ta, $\Delta$KET* has a very close correlation with $\Delta$SET* and the detecting efficiency of the actual thermal environment is high.

Figure 15:
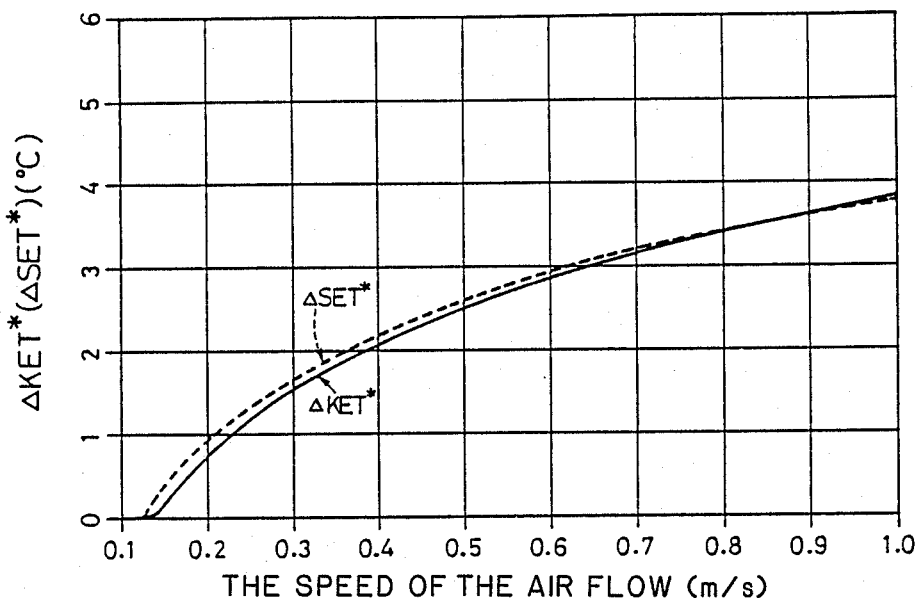
FIGS. 15 and 16 each show the characteristics which, compared with $\Delta SET^*$, illustrate $\Delta KET^*$ regarding the speed of the air flow and the difference between the mean radiant temperature and the temperature of the air, in the case of restricting specially each diameter of the heating elements and each supplied thermal quantity to the other predetermined values within the range of this invention.
Figure 16:
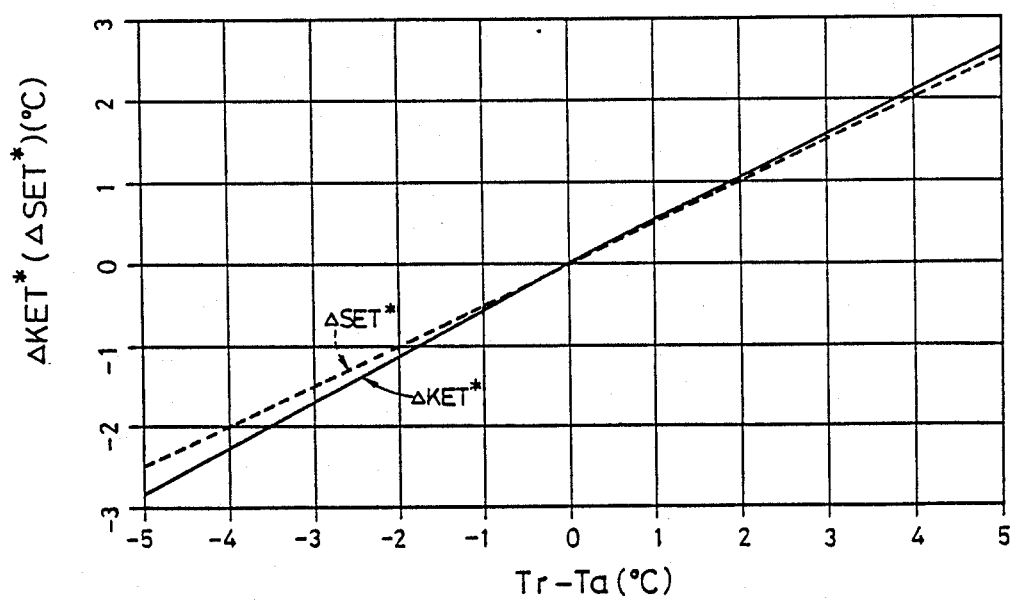

Furthermore, provided that the diameter, D of said heating element is set at D=100 mm and the supplied thermal quantity, M at M=92.2 W/m$^2$ (1.585 Met) and when regarding the thermal-environment sensor, the speed of the air flow is varied within a range of between 0.1 m/s and 1.0 m/s, the varied value, $\Delta$KET* of KET* which varies from the standard state (when the speed of the air flow is 0.1 m/s) is given the characteristics illustrated by a full line in FIG. 15. A broken line in said FIG. illustrates the characteristic of the varied value, $\Delta$SET* of SET* under the same condition. In addition, provided that in the same thermal-environment sensor as the above, the difference, (Tr−Ta) between the mean radiant temperature, Tr and the temperature of the air, Ta in an indoor environment is varied within a range of between −5° C. and +5° C., the characteristic of said $\Delta$KET* which varies from the standard state (when Tr equals Ta) is illustrated by a full line in FIG. 16. In FIG. 16, a broken line illustrates the characteristics of $\Delta$SET*. From FIGS. 15 and 16, it is known that in the same way as the above, regarding each of the speed of the air flow and the difference, (Tr−Ta) between the mean radiant temperature, Tr and the temperature of the air, Ta, $\Delta$KET* has a very close correlation with $\Delta$SET* and the detecting efficiency of the actual thermal environment is high.

Figure 17:
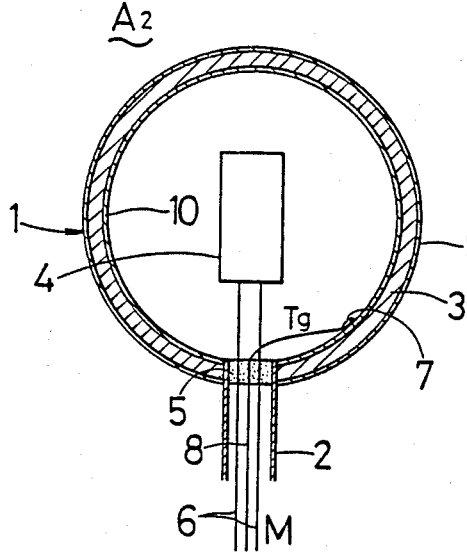
FIGS. 17 and 18 each show the cross section of the thermal-environment sensor in the 2nd and the 3rd embodiment of this invention.
Figure 18:
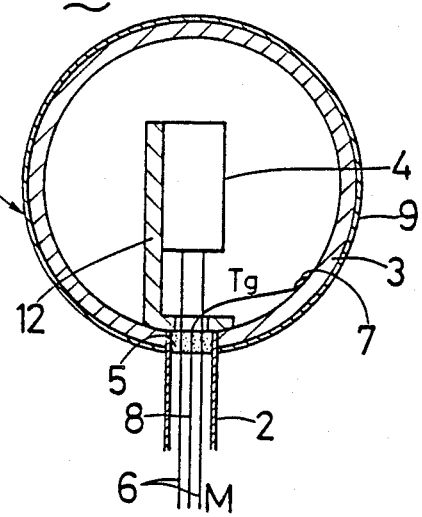

FIGS. 17 and 18 show each of the thermal-environment sensors (A$_2$), (A$_3$) concerning each of the 2nd and the 3rd embodiments of this invention, which are so composed as to transfer heat from the electric heater (4) in said 1st embodiment to the shell (3) so as to keep the heat flux of the shell (3) invaried. That is, in the thermal-environment sensor (A$_2$) of the 2nd embodiment shown in FIG. 17, in comparison with the thermal-environment sensor (A$_1$) having the composition of said 1st embodiment, the whole inside surface of the shell (3) of the heating element (1) is painted by paints with high emissivity as a means for heat transfer: for example, a layer of paints (10) such as matte black (emissivity is about 0.95) is covered thereon.

Therefore, regarding said thermal-environment sensor (A$_2$), inside the shell (3) of the heating element (1) enclosing the electric heater (4), the heat value by said electric heater (4) does not only heats the upper part of the shell (3) by convection heat transfer, but radiates equally all over the shell (3) due to the layer of paints (10) with high emission that covers the inside of the shell (3); and by this heat transfer by radiation, the whole shell (3) can be heated almost equally. Furthermore, as the shell (3) is made of a metal with high heat conductivity, the shell (3) can be heated more equally by this heat conduction. Hence, since the condition of the eqability of the heat flux as the premise of the thermal equilibrium expression of the thermal-environment sensor (A$_2$) is closely met, the thermal condition can be detected precisely, and by the control of the air-conditioning system based on this, comfort of the indoor environment can be improved.

Furthermore, in the thermal-environment sensor (A$_3$), the 3rd embodiment of this invention illustrated in FIG. 18, in comparison with said thermal-environment sensor (A$_1$), said 1st embodiment, the lower part of the shell (3) is connected with the electric heater (4) by materials with heat conduction made of a metalic plate as a means for heat transfer which has a section of a capital letter L-shape; and the heat value of the electric heater (4) is conducted mainly to the lower part of the shell (3). Therefore, in this thermal-environment sensor (A$_3$), inside the shell (3) of the heating element (1) enclosing the electric heater (4), the heat value by said electric heater (4) is transferred to the upperside of the shell (3) by its convection; and heats the upper part of the shell (3); and also is transferred to the lower part of the shell (3) by its conduction through the materials with heat conduction connecting the lower part of the shell (3) with the electric heater (4); and heats the lower part of the shell (3); therefore, from both of the two parts, the whole of the shell (3) can be heated almost equally. Hence, in the same way as the above, the condition of the equability of the heat flux which is the premise of the thermal equilibrium expression is closely met. In addition, the materials with heat conduction (12) connecting the electric heater (4) with the shell (3) do not only contact and transfer heat mainly to the lower part of the shell (3), but contact and transfer heat more strongly to the lower part of the shell (3) and more weakly to the upper part, as illustrated in Fig. It is important to increase heat conduction from the electric heater (4), which then increases the heat in the lower part of the shell (3) so as to compensate for convection heat transfer.

Figure 19:
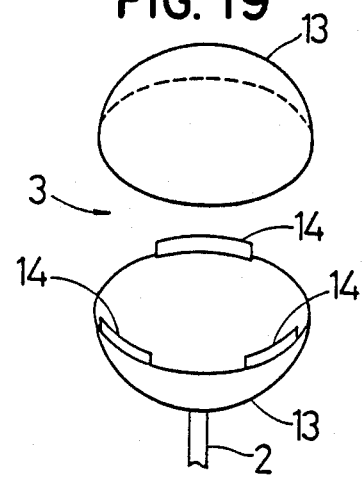
FIG. 19 shows a disassembled perspective view illustrating the process of making an empty spherical shell.

In this connection, one of the production processes of said empty shell (3) is described from FIG. 19:

said shell (3) is composed of a couple of hemisphere shaped shells (13), (13), a half of an empty shell; and inside the junction of the one hemisphere (13), plural metallic guide-plates (14) . . . of ribbon-shape (in this case, 3 pieces) are fixed by spot welding or soldering, etc. from the inside thereof; by said guide-plates (14) . . . both hemisphere shells, (13), (13) are connected; the guide-plates (14) . . . are fixed on the inside of the other hemisphere (13) by soldering, etc.

The shell (3) made in this way has high sphericity without a prominence and a difference in level on the surface thereof and has low heat resistance by contact in the junction and can be produced solidly at low cost.

Figure 20:
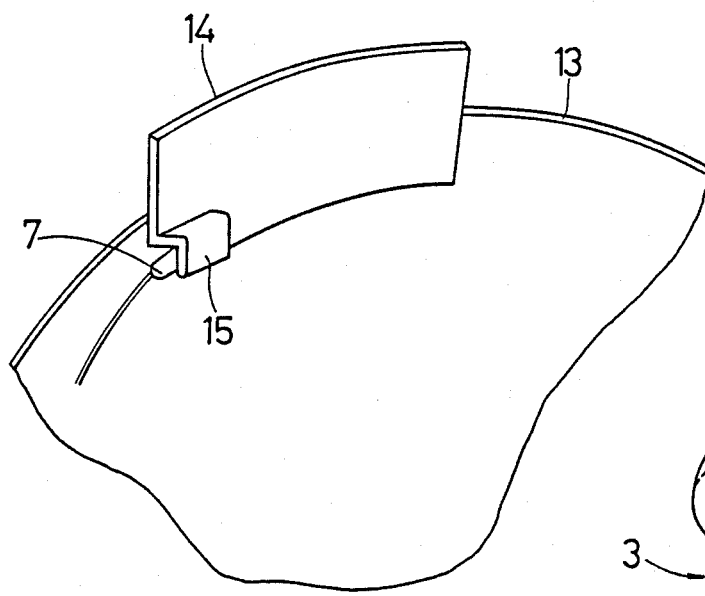
FIG. 20 shows the perspective view of the essential part illustrating the method of fixing a thermocouple.

Furthermore, by using said guide-plates, a thermocouple (7) can be fixed without a problem of heat resistance due to adhesives. That is, as illustrated in FIG. 20, a part of the guide-plate (14) is bent inside so as to form a pressing part (15); and in fixing the guide-plate (14) on the hemisphere (13), the thermocouple (7) is fixed by pressing and attaching said pressing part (15). In fixing this, adhesives can be used jointly. Hence, since the thermocouple (7) is fixed by pressing the pressing part (15), adhesives are not necessary; and if used, very little in quantity; so, the increase of heat resistance due to adhesives can be restrained and also the temperature at output doesn't vary so widely; therefore, the thermocouple (7) can be fixed with a simple composition solidly at low cost.

Figure 21:
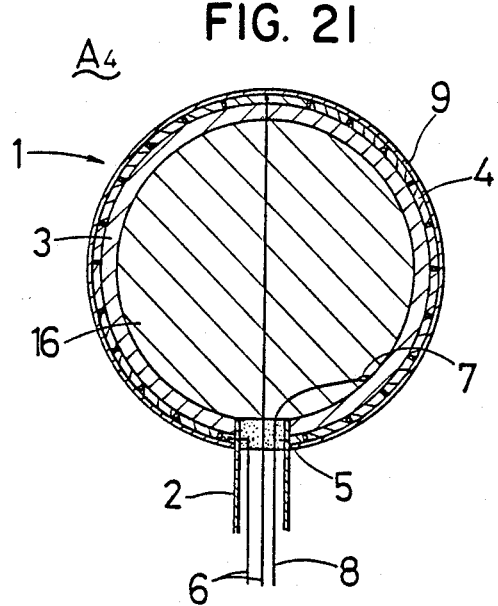
FIG. 21 shows the cross section of the thermal-environment sensor, the 4th embodiment of this invention.

Furthermore, FIG. 21 shows the thermal-environment sensor ($A_4$), the 4th embodiment of this invention illustrating that the change of the composition of the heating element (1) itself makes the shell (3) have the equability of the heat flux:

i.e. the heating element (1) is composed and disposed so as to have the equability of the heat flux in the shell (3) having a panel-shaped electric heater (4) of a ribbon style coiled around the outside surface of the shell (3). In connection, said electric heater (4) is covered over the surface thereof by a layer of radiant materials (9) made of fluorine resins such as tetrafluoroethylene(PTEF) and a pigment such as titanium dioxide($TiO_2$) etc. which have electric insulation, and also a spectral emissivity that closely conforms to that of the human skin or clothes thereon; on the inside surface of said shell (3), the thermocouple (7) measuring the temperature of the shell (3) (the surface temperature of the heating element (1)), Tg is fixed; and in the empty part of said shell (3), a heat insulator (16) made of foam materials such as polyurethane foam, etc. is packed.

Figure 22:
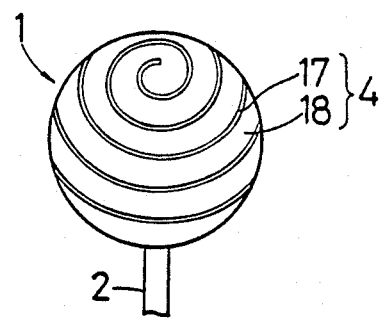
FIG. 22 shows the perspective view illustrating the method of making a panel-shaped electric heater.

Here, an example of the production process of said panel-shaped electric heater (4) will be illustrated from FIG. 22:

a layer of paint with electrical insulation (17) is formed over the whole outside surface of the shell (3) by coating the paint with electrical insulation; then, in the state of being masked by masking material having a whirlpool pattern thereon, a layer of paint with electrical conduction (18) is formed by coating the paint with an electrical conduction such as fluorine resin, etc. containing carbon. During that process, said layer of paint with electrical conduction (18) is insulated by a layer of paint with electrical insulation (17) of whirlpool style, and so, it is formed in a whirlpool style. After that, the masking material is removed; then a layer of radiant materials (9) with electrical insulation is painted thereon.

Therefore, in the thermal-environment sensor ($A_4$), the 4th embodiment of this invention, as the shell (3) in the heating element (1) is heated by direct heat conduction so that the shell (3) has the equability of the heat flux due to the panel-shaped electric heater formed on the outer surface thereof; also, since the shell (3) is composed of a metal with high heat conductivity, the whole of the shell (3) can be heated equally. Hence, since the condition of the equability of heat flux which is the premise of the expression of the thermal equilibrium of the thermal sensor ($A_4$) is met, the thermal condition can be detected precisely, and furthermore, comfortableness in a room can be greatly improved by control of the air-conditioning system based on this sensor. In addition, since said shell (3) is heated by direct heat conduction from the panel-shaped electric heater (4), the temperature, Tg of the shell (3) and the output of the thermocouple (7) measuring said temperature, Tg can make a good rise and response promptly: therefore, the rising performance and the responsing performance can be improved, and also, the precision of the thermal detecting can be increased.

Figure 23:
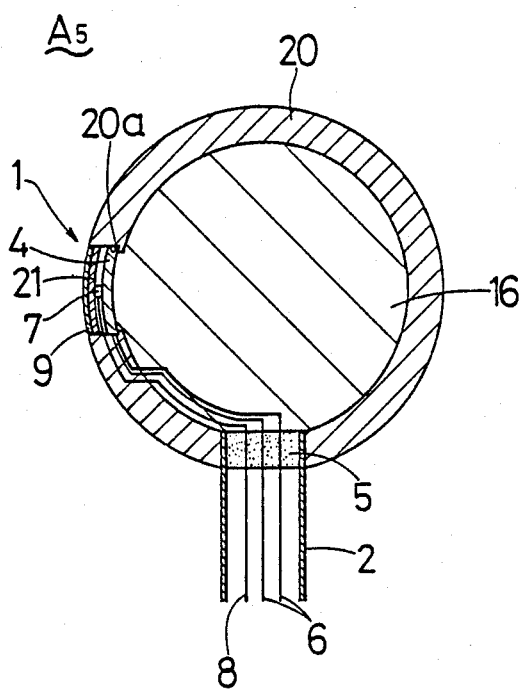
FIG. 23 shows the cross section of the thermal-environment sensor, the 5th embodiment of this invention.
Figure 24:
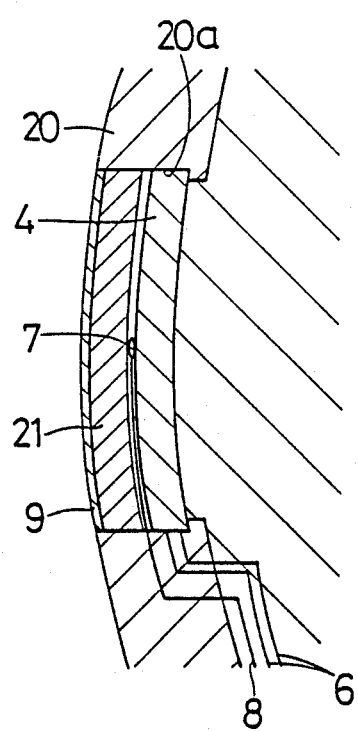
FIG. 24 shows an enlarged view of the essential part.

FIG. 23 shows the thermal-environment sensor ($A_5$) concerning the 5th embodiment of this invention and in this embodiment, only one part of the shell (3) with heat conduction is heated, in comparison with the abovementioned sensors in which the whole of the shell (3) is heated. That is, the heating element (1) is provided with an empty spherical shell (20) composed of resins such as polystyrene, etc. and other heat insulators; a part of said shell (20) is cut off, and in said part cut off (20a), a heat conductor (21) made of metal such as copper, etc. and an electric heater (4) are arranged and fixed by adhesives, etc. with said heat conductor (21) outside. FIG. 24 shows the enlargement of this to illustrate it in detail. Furthermore, between said heat conductor (21) and the electric heater (4), the thermocouple (7) which functions as the thermal detector to detect the surface temperature, Tg of the heat conductor (21), is fixed. In addition, in the empty part of said shell (20), a heat insulator (16) made of foam materials such as polyurethane foam, etc. are packed.

And, a supply electric power cord (6) supplying said electric heater (4) with electric power and an output line (8) of the thermocouple (7) are led outside through the inside of the shell (20) made of the heat insulator and the heat insulator (16) and further through a supporting pole (2). Then, said electric heater (4) is heated by an electric current; in the state that said electric heater (4) is supplied with the predetermined thermal quantity so that the heat value equal the product of the generated heat value, M per a unit surface area of the human body and the outer surface area, $A_2$ of the heat conductor (21), the surface temperature, Tg of the heat conductor (21) is detected by the output voltage of the thermocouple (7); then, based on this surface temperature, Tg, the thermal condition in an indoor environment is detected in the same way as the effective temperature condidering heat loss due to radiation, convection, and evaporative heat loss from the human body.

Furthermore, the outer surface of said heat conductor (21) is provided with a layer of radiant materials (9) made of a fluorine resin such as tetrafluoroethylene(PTFE), etc. and a pigment such as titanium dioxide($TiO_2$), etc. whose emissivity closely conforms to the spectral emissivity of the human skin or clothes thereon; so said effective temperature can be detected precisely, conforming the radiant heat transfer coefficient of the human body, etc. to that of the heat conductor (21).

Accordingly, in said thermal-environment sensor ($A_5$) with said composition, the supplied thermal quantity to the electric heater (4) installed in the part of the shell (20) made of the heat insulator which functions as the heating element (1) can be the product of the generated heat value, M per a unit surface area of the human body and the surface area, $A_2$ of the heat conductor (21) and can be decreased in proportion to the rate of the effective surface area, $A_2/A_1$, as compared with a conventional heating element in which the whole of the shell is heated (this effective surface area is $A_1$), so that the input electric power to the electric heater (4) can be decreased: it is possible to use an electric cell such as a dry cell and a solar cell as the source of electric power, so that the thermal-environment sensor can be wireless. Hence, it is possible for the thermal-environment sensor ($A_5$) to be carried easily and freely and it is also possible to detect the thermal environment around the human body always precisely by placing it near the human body; therefore, it is also possible to improve the comfort of the environment surrounding the human body by controlling the air-conditioning system based on the thermal environment surrounding the human body.

In this connection, though in this embodiment, the shell (20) is spherical, column and ellipsoid-of-revolution shapes are available.

And FIGS. 25 and 26 show the thermal-environment sensor ($A_6$) concerning the 6th embodiment of this invention, and different from said 5th embodiment, this heating element (1) is composed as follows:

that is, as illustrated in FIG. 27 by enlargement, the section (20a) of the empty spherical shell made of materials with hardness and heat insulation such as polystylene resin, etc. is provided with an electric heater of disk-shape (4) which is surrounded by a heat insulator of ring-shape (22) made of foam materials with high heat insulation such as polyurethane foam.

Furthermore, on the central part of the surface of said electric heater (4), the thermocouple (7) functions as a temperature detector detecting the surface temperature, Tg thereof. In addition, the outside surface of said shell (20) and said electric heater (4) is provided with a layer of radiant materials (9) with spectral emissivity closely conforming to that of the human skin or clothes thereon.

Therefore, also in this thermal-environment sensor ($A_6$), the input electric power to the electric heater (4) can be decreased, because the supplied thermal quantity to the electric heater (4) is only the product of the generated heat value, M per a unit surface area of the human body and the outside surface area, $A_2$ of the electric heater (4).

And in this case, if said electric heater (4) is installed directly on the section (20a) of the shell (20) and the surface temperature of said electric heater (4) is measured, there exist the following problems:

that is, though it is necessary that the thermal-environment sensor has a composition with the characteristics of heat transfer equal to the human body, in said composition, heat from the electric heater is transferred to the surroundings of the electric shell, so, there exists heat loss by transfer: therefore, as illustrated in FIG. 29, the expression of heat balance of said electric heater (4) is given by:

$$M = Qc + Qr + Qloss$$

(whereas, M: the heat value of the electric heater; Qc: the heat loss by convection; Qr: the heat loss by radiation; Qloss: the heat loss by transfer to the shell).

Said Qc is a function of the speed of the air flow; Qr is a function of the radiant thermal quantity: they are equal to the human body in heat transfer (in this case, the heat loss by transfer from the back of the electric heater (4) need not be considered, since the heat capacity of the back of the shell is minimum). And on condition that the heat value of the electric heater, M is invariable and said Qloss is large, (Qc+Qr) decreases relatively and differs from the characteristics of the speed of the air flow and the radiation of the human body.

For this reason, it is necessary that the input quantity to the elecric heater is greatly increased in order to disregard heat loss by transfer, Qloss, in comparison with said (Qc+Qr), and also the efficiency decreases, in comparison with the case of a little heat loss by transfer. And also, in order to measure the surface temperature of said heating element (1) precisely, it is considered that the heating element (4) is to be provided with a heat conductor on the surface of said electric heater (4), and by this heat conductor, the surface temperature of the heating element can remain unvaried and uniform in the whole of the heating element: so, this surface temperature can be detected by the temperature detector. But, though in this case, heat loss by transfer occurs from the surroundings of the electric heater to the shell, the difference in temperature between the surroundings of said electric heater and the shell increases; on the contrary, said heat loss by transfer increases, because the surface temperature of the surroundings of said electric heater is closely equal to that of the center of the electric heater. Compared with this, in this embodiment, the electric heater (4) is installed on the section (20a) of the shell (20), without a heat conductor installed on the surface thereof but with a heat insulator (22) interposed around said electric heater: therefore, the surface temperature of the surroundings of said electric heater (4) can be kept low; also, the heat conduction from the surroundings of the electric heater (4) to the shell (20) is almost entirely intercepted; so, the quantity of the heat loss by transfer can be greatly decreased, and by decreasing this heat loss by transfer, the input electric power to said electric heater (4) can be decreased still further and also the detecting precision can be improved. As a result, a wireless device is possible by using an electric cell as a power supply, and thus it is possible to detect the thermal environment around the human body always precisely with the sensor near the human body.

Now, regarding the thermal-environment sensor ($A_6$) with the composition of said 6th embodiment, the surface temperature distribution of the electric heater (4) and of the surroundings thereof is concretely measured in the windless state. FIG. 28 illustrates the result of measuring by a full line. And also, FIG. 28 illustrates the compared examples; each surface temperature distribution of the one without a heat insulator around the electric heater (4), (the 1st compared example) and of the one with a heat conductor on the surface of the electric heater (4), (the 2nd compared example) is illustrated each by a broken line and a chain line. From FIG. 28, in both of the 1st and the 2nd compared examples, as each shell is contacted directly to the surroundings of the electric heater, the surface temperature of that junction is high, especially in the 2nd compared example, a rise in the surface temperature of the junction is remarkable, because the surface temperature of the heating element is made to be uniform by the heat conductor. As compared with these examples, the embodiment of this invention is different from said two compared examples in the following points:

[1]. the surface of the electric heater (4) is not provided with a heat conductor; and [2]. the heat insulator (22) with a high adiabatic is interposed between the surroundings of the electric heater (4) and the section (20a) of the shell (20);

so, it is known that the surface temperature of the junction of the electric heater (4) and the shell (20) is low, and that the quantity of heat loss by transfer from the electric heater (4) to the shell (20) is decreased. As a result, wireless device is possible by using an electric cell of low capacity, and it is possible to improve the detecting efficiency due to the decrease of input electric power to the electric heater (4).

In this connection, though in said 5th and 6th embodiments, one set of an electric heater (4) and a thermocouple (7) is installed on one point in one part of the shell (20), sets of them can be installed on some other points thereof. In this case, the mean value of the output of each set of the thermocouple (the temperature detector) is the output temperature. In other words, on the condition that one part of the shell (20) is heated, the heat transfer coefficient is varied partially depending on the angle of the direction of a wind (the main flow direction); and also, accompanied with said varied heat transfer coefficient, said surface temperature of the shell (20) is varied depending on the direction of a wind. As illustrated in FIGS. 30 and 31, in order to get rid of the influence of the direction of a wind, 2 pieces of the electric heaters (4) are installed on the shell (20) of sphere-shape or column-shape. It is preferable to install them at a phase angle of 180 degrees with the central axis of the shell (20) of sphere-shape or column-shape in order to minimize the influence of wind direction. This is clear from FIG. 32 that illustrates the relation of the variation range of the surface temperature of the shell in varying the direction of a wind from an angle of 0 degrees to an angle of 360 degrees with a phase angle between said 2 electric heaters, where the speed of air flow ranges to between 0.29 m/s and 0.8 m/s.

And FIGS. 33 and 34 show the thermal-environment sensor ($A_7$) concerning the 7th embodiment of this invention, which is embodied by simplifying the composition of the one part heating type. In said Figures, the center of the heat insulator (20) of disk-shape is provided with a receiving part (20b) which penetrates inside and outside thereof along the central axis; an electric heater (4) of panel-shape is installed in said receiving part (20b); also on the inside and the outside of said electric heater (4), each thermocouple (7), (7) detecting the surface temperature, Tg of the electric heater (4) is installed: in the above way, the heating element (1) is composed. Furthermore, layers of radiant materials (9), (9) are installed on the inside and outside of said heat insulator (20).

In this embodiment, because in the case of the heating element (1) provided with only a small panel-shaped electric heater (4), the convective heat transfer coefficient is so large that the thermal-environment sensor ($A_7$) is composed so as to have characteristics of heat transfer equal to those of the human body by decreasing said convective heat transfer coefficient by installing the heat insulator (20) which is the non-heat-transfer part, around the electric heater (4), and by developing the boundary layer of speed; but the convective heat transfer coefficient varies depending on the length of the non-heat-transfer part, so said heat insulator (20) is shaped into a disk so as to get rid of the characteristic of the direction. Accordingly, in comparison with a sphere or column-shaped heat insulator, the insulator (20) can have a low capacity; it is possible to reduce the material cost and to simplify the composition thereof and also, to save electric power due to detecting both the inside and the outside thereof with one electric heater (4).

Figure 35:
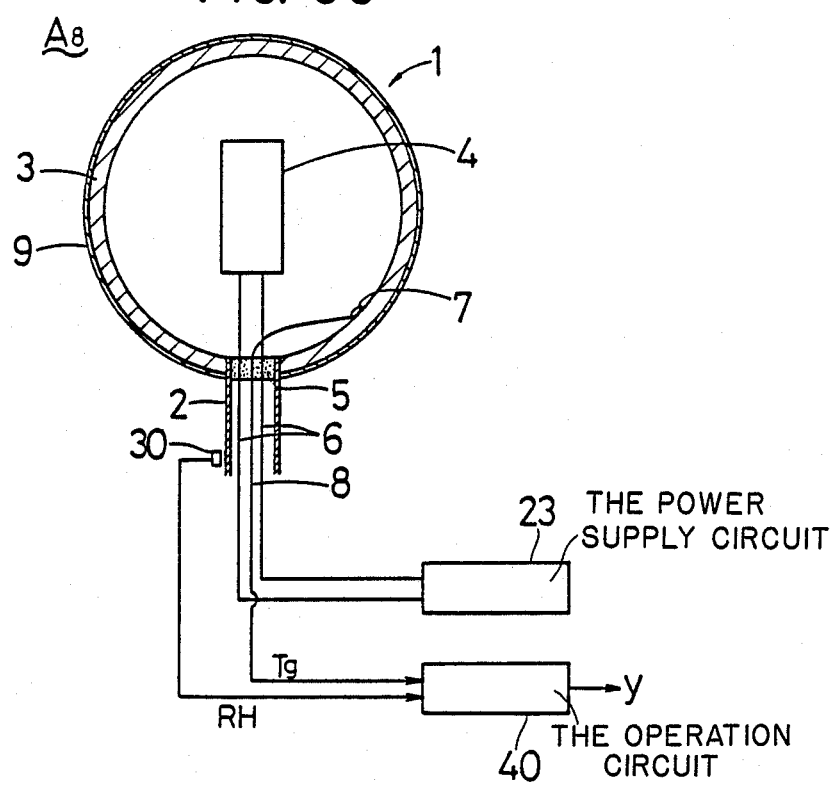
FIG. 35 shows the outline of the thermal-environment sensor, the 8th embodiment of this invention.

FIG. 35 shows a thermal-environment sensor ($A_8$), the 8th embodiment of this invention, which detects thermal conditions in a room considering the temperature of the air, the speed of the air flow, the radiation, and the humidity, that is, in the same way as the human body. The electric heater (4) of the heating element (1) is heated by passing an electric current from a power source circuit (23); the heating element is supplied with the thermal quantity, M; in that state, the surface temperature, Tg of the heating element (1) is detected by the output voltage; then, based on this surface temperature, Tg of the heating element (1), thermal conditions in a room can be detected considering the temperature of the air, the speed of the air flow, and the radiation, that is, in the same way as the human body; the above-mentioned is the composition of this thermal-environment sensor ($A_8$). On the other hand, a humidity detector (30) placed in a room as a humidity detector which detects the humidity, RH in the room is installed; the output of said humidity detector (30) is input with the output of said thermocouple (7) to an calculation circuit (40) as an calculation means. Said operation circuit (40) is composed so as to calculate the effective temperature, y in a room corresponding to the temperature of the air, the speed of the air flow, the radiation, and the humidity by the expression of $y=f(Tg, RH)$, based on the surface temperature, Tg of the heating element (1) given by the thermocouple (7) and the humidity, RH in the room given by the humidity detector (30). As the calculation expression in the calculation circuit (40), the following empirical formulas are used: for example, in the case of the supplied thermal quantity equal to 86 W/m$^2$, the empirical formula of $y=Tg+2.31RH-8.39$ is used; also, in the case the supplied thermal quantity equal to 101 W/m$^2$, the empirical formula of $y=Tg+2.31RH-9.54$ is used. In addition, the outer surface of the shell (3) in said heating element (1) is provided with a filmy layer of radiant materials (9) with spectral emissivity closely conforming to the spectral emissivity of the human skin or clothes thereon; so said effective temperature can be detected more precisely by conforming the radiant heat transfer coefficient of the human body, etc. to that of the heating element (1).

Accordingly, in the thermal-environment sensor ($A_8$) composed as the above-mentioned, the thermocouple (7) detects the surface temperature, Tg of the heating element (1) supplied with a predetermined thermal quantity; this surface temperature, Tg is a function of the temperature of the air, the speed of the air flow, and the radiation as explained before in said expression of thermal equilibrium. Furthermore, the humidity, RH in the room is detected by the humidity sensor (30). And then, by the calculation circuit (40), the effective temperature, y is calculated from the expression of $y=f(Tg, RH)$ based on the surface temperature, Tg of these heating elements (1) and the humidity, RH in the room: so, this effective temperature, y can correspond to the temperature of the air, the speed of the air flow, the radiation, and the humidity. Hence, since this effective temperature, y considers all of the thermal environment factors such as the temperature of the air, the speed of the air flow, the radiation, and the humidity, thermal conditions can be detected precisely in any indoor environment as any of these thermal environment factors vary. As a result, in the case that the air-conditioning system is controlled based on the detection of this effective temperature, y, once a user sets the predetermined effective temperature which he feels comfortable, thermal conditions in a room can always be kept in a comfortable condition without need to vary said temperature during the season by the automatic detection of the variation of the effective temperature, y depending on the variation of the temperature of the air, the speed of the air flow, the radiation, and the humidity: accordingly, it is possible to realize fully automatic operation.

Figure 36:
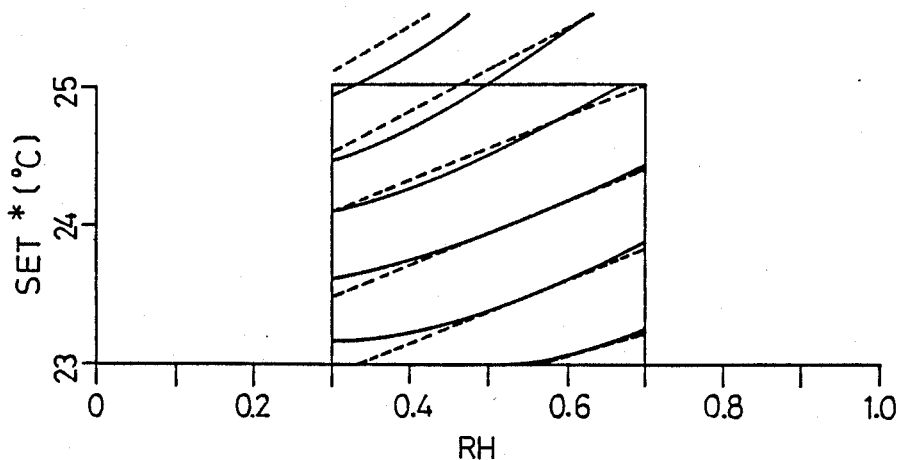
FIG. 36 illustrates the comparison between the value of the effective temperature in said embodiment and the value of SET*.

Now, FIG. 36 illustrates concretely the results of the comparison of the value of the effective temperature and the value of SET* which is an index of logarithm adopted by the American Society of Heating-Refrigerating and Air-conditioning Engineers, ASHRAE in the U.S.A.; the former is given by the expression of $y=Tg+2.31RH-8.39$ as the calculation expression of said calculation circuit (40), and the latter is the value of the new standard effective temperature which has a close relationship with the sense of coolness or warmth, and comfort of the human body. In said Fig., a broken line illustrates the value calculated by said calculation circuit; and a full line illustrates the value of SET*. And from FIG. 36, it is known that both of them are closely equal in value within the range of comfort where the air-conditioning system is used (SET* is within a range of between 23° C. and 25° C.; relative humidity, RH is between 30% and 70%); and that the value of the effective temperature in this invention conforms to the actual bodily sensations of the human body quite precisely.

Figure 37:
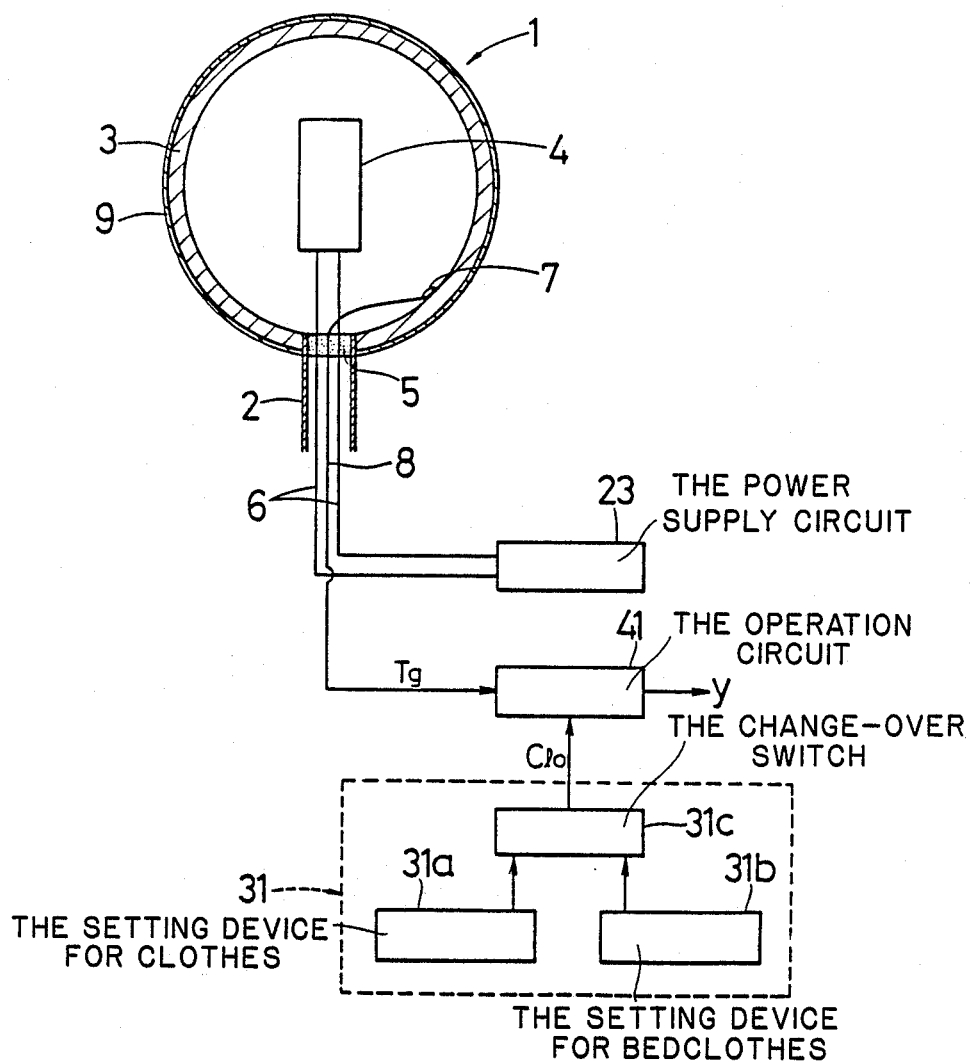
FIG. 37 shows the outline of the thermal-environment sensor, the 9th embodiment of this invention.

FIG. 37 shows a thermal-environment sensor ($A_9$) concerning the 9th embodiment of this invention, which detects thermal conditions in an indoor environment in the same way as the effective temperature considering the temperature of the air, the speed of the air flow, the radiation, and the quantity of clothes on the human body. To detail this, it is composed as follows:

wherein, the electric heater (4) of the heating element (1) is heated by passing an electrical current from the power source circuit (23); and this heating element (1) is supplied with the thermal quantity, M; in that state, the surface temperature, Tg of the heating element (1) is detected by the output voltage from the thermocouple (7); based on this surface temperature, Tg of the heating element (1), the thermal conditions in a room can be detected in the same way as the effective temperature, considering the temperature of the air, the speed of the air flow, and the radiation.

On the other hand, this thermal-environment sensor is equipped with an adjusting device for the quantity of clothes (31) which is placed in the room, adjusting thermal resistance, Clo corresponding to the quantity of clothes on the human body: this adjusting device for the quantity of clothes (31) is composed of a setting device for clothes (31a) which sets thermal resistance, Clo corresponding to the type of clothes; and a adjusting device for bedclothes (31b) which sets thermal resistance, Clo corresponding to the type of bedclothes: the output of said adjusting device for clothes (31a) and said adjusting device for bedclothes (31b) are input in the calculation circuit (41) as a means for calculation through a change-over switch (31c) with the output of said thermocouple (7). This operation circuit (41) is composed so as to calculate the effective temperature, y in a room which corresponds to the temperature of the air, the speed of the air flow, the radiation, and the quantity of clothes, by using the expression of $y=f(Tg, Clo)$; based on the surface temperature, Tg of the heating element (1) given by the thermocouple (7) and the thermal resistance, Clo which corresponds to the quantity of clothes given by the adjusting device for the quantity of clothes (31) (the adjusting device for clothes (31a) or the adjusting device for bedclothes (31b)). In this connection, as the calculation expression in this calculation circuit (41), the following empirical formulas are used: that is, for example, in the case of the supplied thermal quantity equal to 86 W/m², the formula of $y=Tg+6.03Clo-10.85$ is used; in the case of the supplied thermal quantity equal to 101 W/m², the formula of $y=Tg+6.03Clo-12.0$ is used. Furthermore, the outer surface of the shell (3) of said heating element (1) is provided with a filmy layer of radiant materials (9) with a spectral emissivity closely conforming to that of the human skin or clothes thereon.

Figure 38:
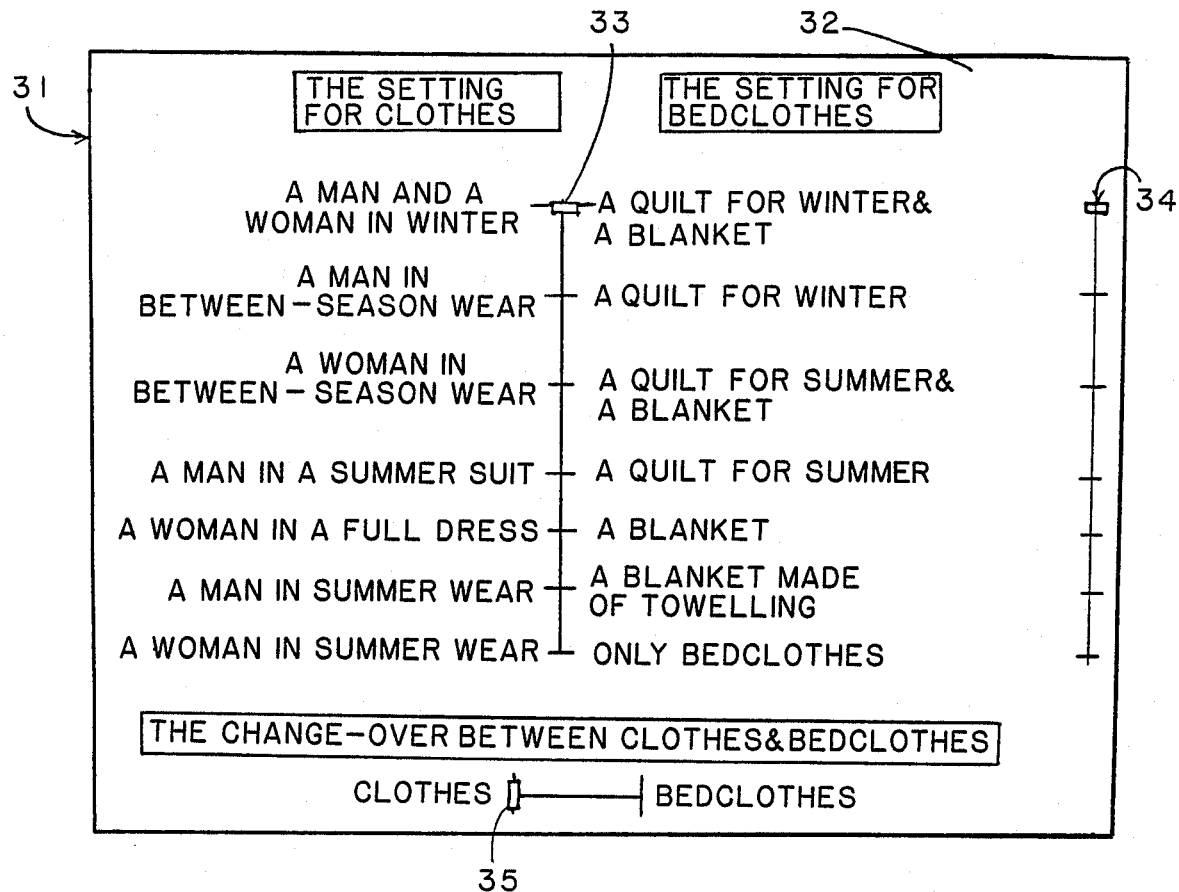
FIG. 38 shows the front view illustrating a concrete composition of an operation panel of the setting device for the quantity of clothes.

Next, FIG. 38 illustrates one example of the composition of an calculation panel on said adjusting device for the quantity of clothes (31). On said calculated panel (32) as illustrated in FIG. 38, the following instructions are put in order from the upper side to the lower side:

that is, on the side for the adjusting for clothes, a man and a woman in winter wear (for example, in this case, the thermal resistance, Clo shows Clo=1.0); a man in between-season wear (in this case, Clo=0.8); a woman in between-season wear (in this case, Clo=0.7); a man in a summer suit (in this case, Clo=0.5); a woman in full summer dress (in this case, Clo=0.4); a man in summer wear (in this case, Clo=0.3); a woman in a light summer dress (in this case, Clo=0.3), etc. are arranged: and a 1st slide grip (33) which slides up and down between each instruction is provided.

Furthermore, also in the side for the adjusting for bedclothes, the following instructions are arranged in order of value of thermal resistance, Clo from the upper side to the lower side:

that is, a quilt for winter and a blanket; a quilt for winter; a guilt for summer and a blanket; a quilt for summer; a blanket; a blanket made of towelling; and night clothes only, etc.: and a 2nd slide grip (34) which slides up and down between each instruction is provided.

In addition, for the use of the change-over between the setting for clothes and the setting for bedclothes, the instructions for clothes and bedclothes are provided on the right and the left, and a 3rd slide grip (35) which slides between them is provided. As above-mentioned, a user can set the value of the thermal resistance corresponding to the quantity of clothes on the human body as follows:

that is, in the daytime, the 3rd slide grip (35) is placed on the clothes instruction; the 1st slide grip (33) is placed on the instruction corresponding to the kind of clothes for that time: on the other hand, at bedtime, the 3rd slide grip (35) is placed on the bedclothes instruction and the 2nd slide grip (34) is placed on the instruction corresponding to the kind of bedclothes for that time.

Accordingly, in the thermal-environment sensor ($A_9$) composed as the above-mentioned, the surface temperature, Tg of the heating element (1) supplied with the predetermined thermal quantity is detected by the thermocouple (7); this surface temperature, Tg is the function of the temperature of the air, the speed of the air flow, and the radiation as mentioned in said expression of thermal equilibrium. Furthermore, the thermal resistance, Clo corresponding to the quantity of clothes on the human body is adjusted by calculating the adjusting device for the quantity of clothes (31). And then, in the calculation circuit (41), the effective temperature, y is calculated by the expression of $y=f(Tg, Clo)$ based on the surface temperature, Tg of the heating element (1) and the thermal resistance, Clo of the quantity of clothes: for this reason, this effective temperature, y corresponds to the temperature of the air, the speed of the air flow, the radiation, and the quantity of clothes. Hence, in the case of controlling the air-conditioning system based on the effective temperature, y, once a comfortable temperature is adjusted, even if the quantity of clothes varied, said comfortable temperature need not to be varied, and only the adjusting device for the quantity of clothes (31) is calculated and adjusted at the thermal resistance which corresponds to the quantity of clothes for that time: so, an equally comfortable thermal environment can be always maintained.

Figure 39:
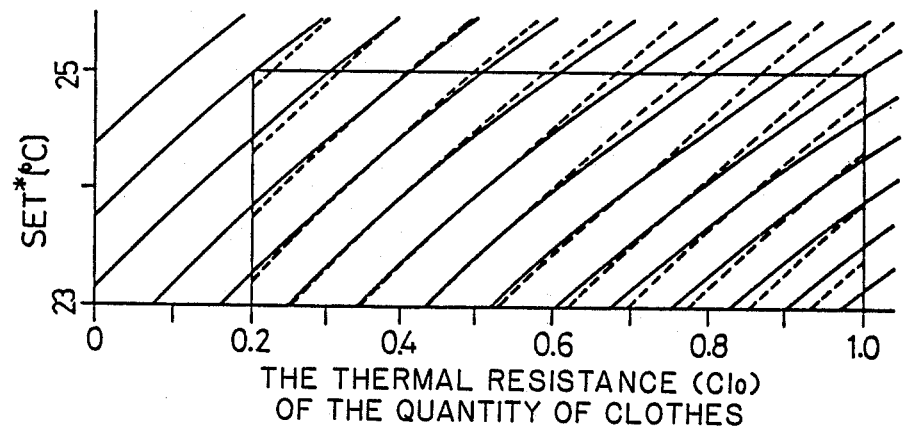
FIG. 39 illustrates the comparison between the value of the effective temperature in said embodiment and the value of SET*.

Now, FIG. 39 concretely illustrates the result of the comparison of the value of the effective temperature and the value of SET* which is an index of logarithm adopted by the American Society of Heating-Refrigerating and Air-conditioning Engineers, ASHRAE in the U.S.A.: the former is given by the expression of $y=Tg+6.03Clo-10.85$ used as the calculation expression of said calculation circuit (41), and the latter is the value of the new standard effective temperature which has a close relationship with the human bodily sensations of warmth or coolness and comfort. In FIG. 39, a broken line illustrates the value calculated by said calculation circuit (10), and a full line illustrates the value of SET*. And from FIG. 39, it is known that both of them are closely equal in their values within the range of comfortableness (SET* =23° C.~25° C.), where the air-conditioning system is used; and that the value of the effective temperature given by this invention conforms almost precisely to actual human bodily sensations.

Figure 40:
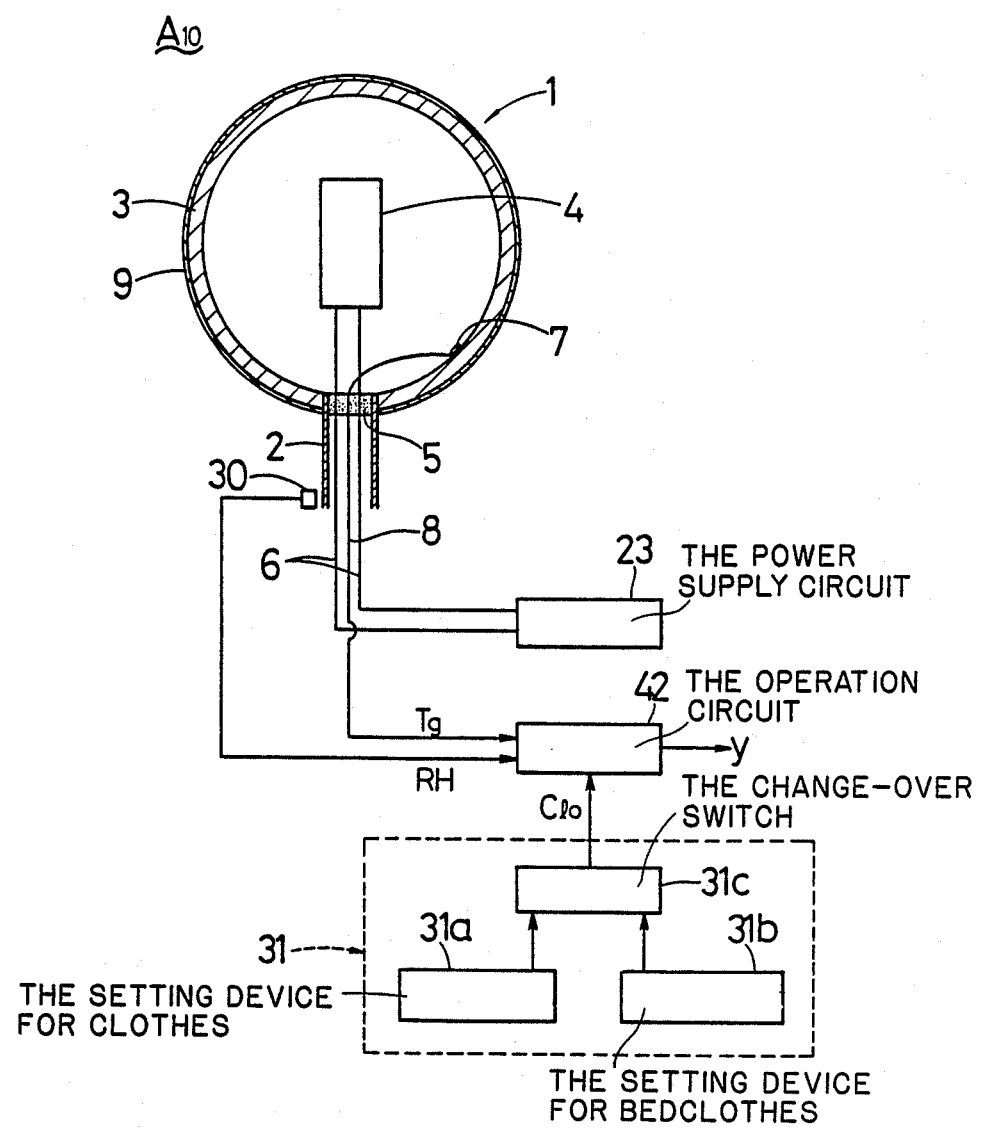
FIG. 40 shows the outline of the thermal-environment sensor, the 10th embodiment of this invention.

FIG. 40 shows a thermal-environment sensor ($A_{10}$), the 10th embodiment of this invention, which detects the effective temperature considering also the quantity of the user's clothes as mentioned in said 9th embodiment, in addition to the temperature of the air, the speed of the air flow, the radiation, and the humidity as mentioned in said 8th embodiment. In FIG. 40, accompanied with the output of the thermocouple (7), the output of the humidity detector (30) and the setting device for the quantity of clothes (31) are input as the means for calculation into the operation circuit (42). This calculation circuit (42) is composed so as to calculate the effective temperature, y in a room corresponding to the temperature of the air, the speed of the air flow, the radiation, the humidity, and the quantity of clothes by the expression of $y=f(Tg, RH, Clo)$, based on the surface temperature, Tg of the heating element (1) given by the thermocouple (7); the humidity, RH in a room given by the humidity detector (30); and the thermal resistance, Clo corresponding to the quantity of clothes given by the adjusting device for the quantity of clothes (31) (the adjusting device for clothes (31a) or the adjusting device for bedclothes (31b)). In this calculation circuit (42), the following empirical formulas are used as the calculation expressions:

that is, for example, in the case of the supplied thermal quantity equal to 86 W/m$^2$, the expression of $y=Tg+2.2RH-5.7Clo-11.8$ is used; and in the case of the supplied thermal quantity equal to 101 W/m$^2$, the expression of $y=Tg+2.2RH-5.7Clo-12.9$ is used.

In this embodiment, the effective temperature, y corresponds to the temperature of the air, the speed of the air flow, the radiation, the humidity and the quantity of clothes: therefore, in the case of controlling the air-conditioning system based on this effective temperature, once a comfortable temperature is set, even if the quantity of clothes varied, said comfortable temperature need not be varied; but only the adjusting device for the quantity of clothes (31) is calculated and set at the thermal resistance, Clo corresponding to the quantity of clothes for that time: so, it is possible to maintain a constantly comfortable thermal environment.

Figure 41:
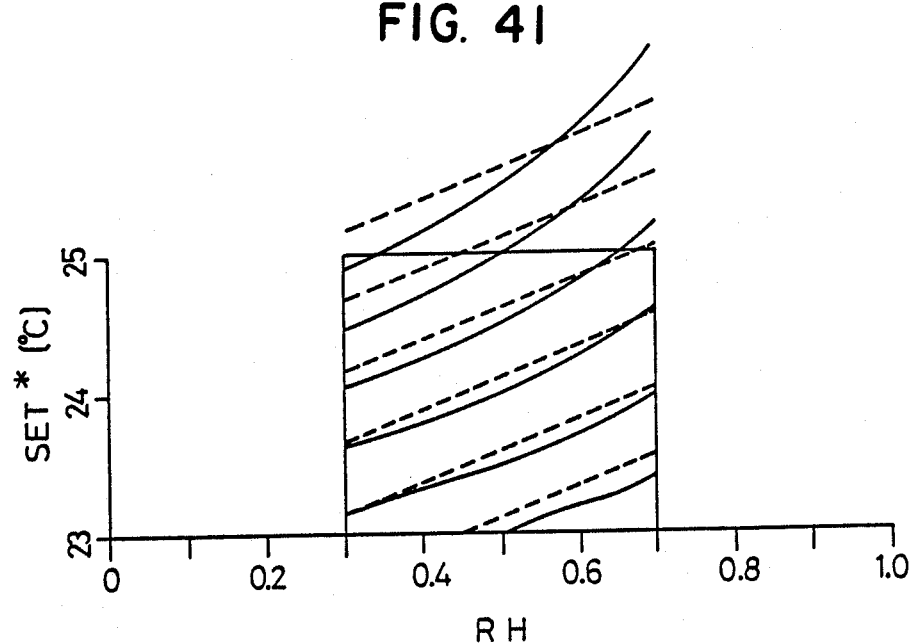
FIGS. 41 and 42 each illustrates the comparison between the value of the effective temperature of each embodiment and the value of SET*.
Figure 42:
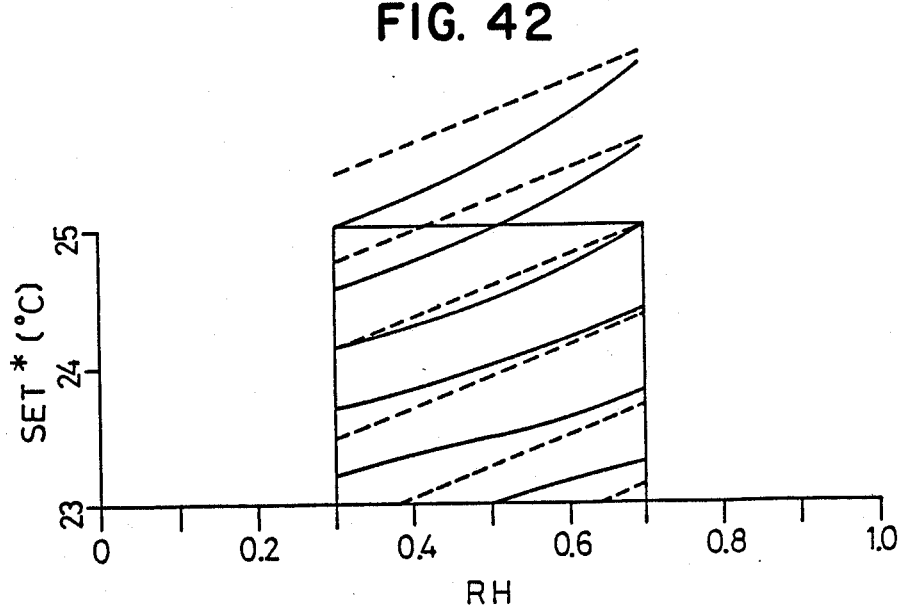

Now, FIGS. 41 and 42 illustrate concretely the result of comparison between the value of the effective temperature and the value of SET*: the former is given by the expression of $y=Tg+2.2RH+5.7Clo-11.8$ used as the calculation expression of said calculation circuit (42). FIG. 41 illustrates the case of the quantity of men's summer wear (Clo=0.3). FIG. 42 illustrates the case of the quantity of winter wear (Clo=1.0). In said FIGS., a broken line illustrates the value calculated in said calculation circuit (42); and a full line illustrates the value of SET*. And from these Figs., it is known that both of them are closely equal in their value within the range of comfortableness (SET*=23° C. to 25° C., relative humidity, RH=30% to 70%), where the air-conditioning system is used, and that the vlaue of the effective temperature given by this invention conforms near exactly to the actual bodily sensations of the human body.

Figure 43:
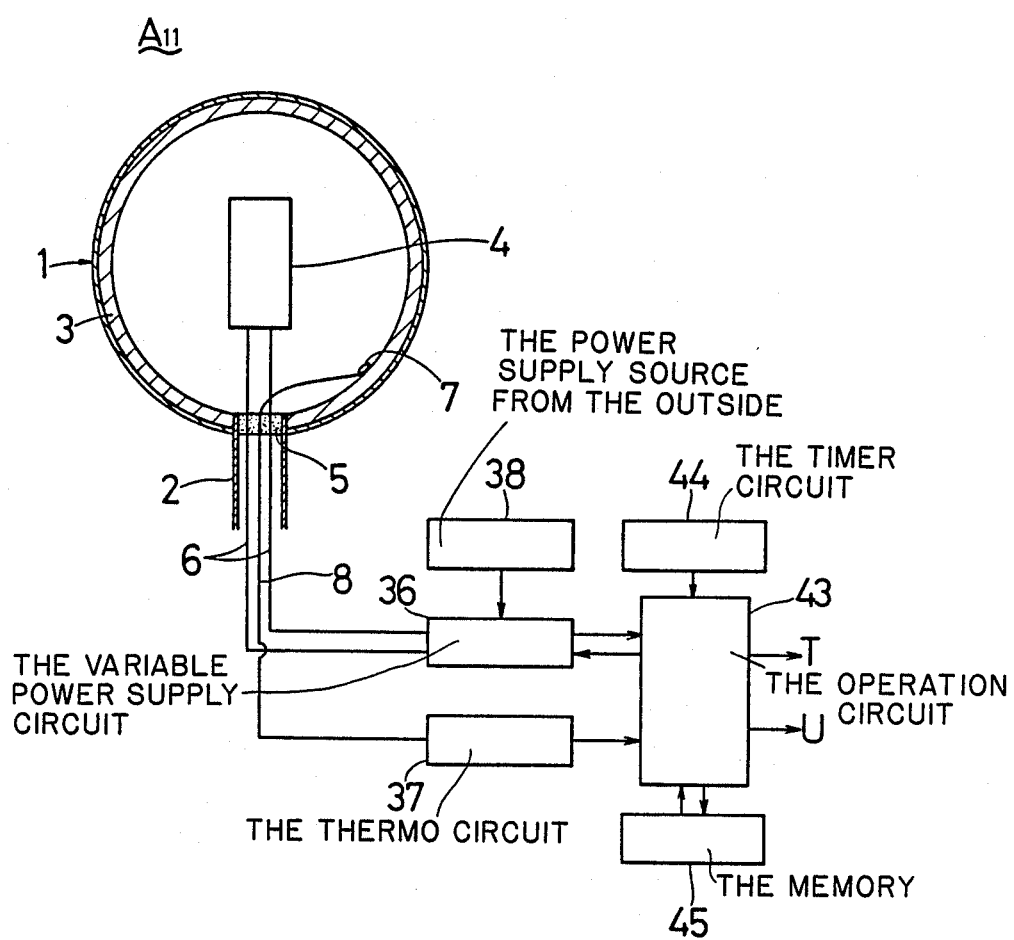
FIG. 43 shows the outline of the thermal-environment sensor, the 11th embodiment of this invention.

FIG. 43 shows a thermal-environment sensor ($A_{11}$), the 11th embodiment of this invention, which computes the speed of the air flow by using detected signals of the thermal conditions in a room. To detail this, the electric heater (4) of the heating element (1) is heated by an electrical currenct; the heating element (1) is supplied with the thermal quantity, M; in that state, the surface temperature, Tg of the heating element (1) is detected by the output voltage of the thermocouple (7); based on this surface temperature, Tg, thermal conditions in a room can be detected in the same way as the effective temperature considering heat loss by radiation, convection, and evaporative heat loss from the human body. And said electric heater (4) is connected with a variable power supply circuit (36) as a means of variable power supply which supplies said electric heater (4) with electric power through an electric power supply cord (6), which supplies said electric heater (4) with electric power and varies the supplied thermal quantity, M to the electric heater (1). On the other hand, said thermocouple (7) is connected with a thermo circuit (37) which converts the electromotive force of said thermocouple (7) into temperature. Said variable power supply circuit (36) is connected with the calculation circuit (43) with the capability of input/output; also, said calculation circuit (43) is connected with said thermo circuit (37) with the capability of input/output. Furthermore, said calculation circuit (43) is connected with a timer circuit, (44) with input capability which sets the time during which the surface temperature, Tg of the heating element (1) varies due to the variation of the supplied thermal quantity, M by said variable power supply circuit (36) and then, remains steady. In addition, said calculation circuit (43) is also connected with a memory device (45) with input capability, which memorizes the surface temperature, $Tg_1$, etc. of the heating element (1), in the case of the supplied thermal quantity, $M_1$, which is the value before the supplied thermal quantity, M is varied by said variable power supply circuit (36). In this way, said calculation circuit (43) is so composed as to calculate the effective temperature, y based on the surface temperature, Tg of the heating element (1) by the supplied thermal quantity, M from the variable power supply circuit, (36); it is also calculates the speed of the air flow, U based on the difference of temperatures, $\Delta Tg$ between the surface temperatures, Tg of the heating element (1) before and after the variation of the supplied thermal quantity, M. In this connection, (38) is an exterior power supply which supplies the variable power supply circuit (36) with electric power.

Figure 44:
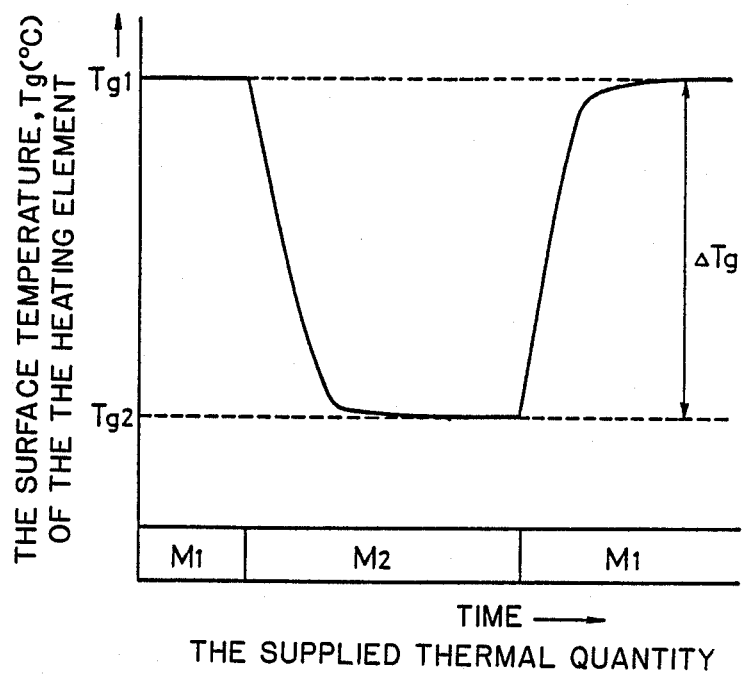
FIG. 44 illustrates the variation of the surface temperature of the heating element, in the case of varying the supplied thermal quantity.

FIG. 44 illustrates this functioning. FIG. 44 illustrates the variation of the surface temperature, Tg of the heating element (1), in the case that the supplied thermal quantity, M to the heating element (1) is varied to an optional supplied thermal quantity, $M_2$ from the optimum supplied thermal quantity, $M_1$ for the use of detecting the effective temperature. The first, the effective temperature, y is detected by the surface temperature, $Tg_1$ of the heating element (1) given by the optimum supplied thermal quantity, $M_1$ from the variable power supply circuit, (36). And the surface temperature, $Tg_1$ at that time is memorized by the memory device (45). Next, the optimum supplied thermal quantity, $M_1$ is varied to an optional supplied thermal quantity, $M_2$, by the variable power supply circuit (36); the surface temperature, $Tg_2$ of the heating element (1) is measured after the surface temperature, Tg becomes steady; the timer circuit (44) sets the time which it takes for said surface temperature, Tg to become steady. And then, based on both of these surface temperatures, $Tg_1$ and $Tg_2$, in the calculation circuit (43), the speed of the air flow, U is given by said expressions (22) and (23). Last, the supplied thermal quantity, M of the variable power supply circuit (36) is restored to the original supplied thermal quantity, $M_1$.

Figure 45:
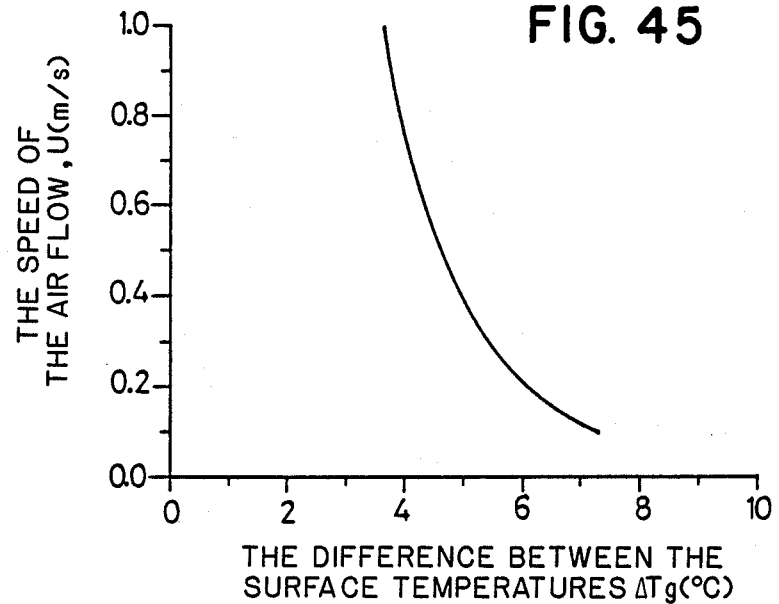
FIG. 45 illustrates the relationship between the difference of the surface temperature of the heating element of the speed of the air flow.

Next, the concrete examples will be explained. Regarding the thermal-environment sensor with the composition of said embodiment, FIG. 45 illustrates the relationship between the speed of the air flow, U and the difference, $\Delta Tg$ of the surface temperature, Tg of the heating element (1), in the case that the diameter, D of the heating element equals 60 mm; the optimum supplied thermal quantity, $M_1$ for the purpose of detecting the effective temperature equals 0.973 W; and the supplied thermal quantity, $M_2$ for the purpose of measuring the speed of the air flow equal 0.0 W. And then, it is known that U corresponds to $\Delta Tg$ to be one to one, and by detecting $\Delta Tg$, the speed of the air flow, U can be measured. In this connection, though FIG. 44 illustrates one example, but it is possible that based on the adjusting conditions of said $M_1$ and $M_2$, the speed of the air flow can be measured within the range of 0.1 m/s to 1.0 m/s which can be detected in a room.

In this connection, in addition to the composition of said 11th embodiment, by installing an indoor temperature detector which detects the temperature of the air in a room, Ta, the mean radiant temperature, Tr can be given by said expression [24], accompanied with the calculation of said speed of the air flow, U. In this case, the merit is that it is easy to adjust either the speed of the air flow, U or the mean radiant temperature, Tr which are factors to cause the surface temperature, Tg of the heating element (1) to miss KET*. For example, in the case of the speed of the air flow, U, the direction of the wind can be varied, and also, in the case of the mean radiant temperature, Tr, it is possible to adjust the wall temperature, etc., whether to increase it or not, which varies depending on the direction of the wind.

(POSSIBLE INDUSTRIAL UTILIZATION)

As is described in the above, the thermal-environment sensor in this invention can detect the thermal conditions of an actual resident room in the same way as the effective temperature, so it is preferable for the thermal-environment sensor to be the means for controlling the operation of an air-conditioning system which is suitable for the human body.

We claim:

1. A thermal-environment sensor for detecting the thermal environment in a room, which comprises:
    a heating element adapted for placement in said room and for being heated with a thermal quantity (M);
    a temperature detector adapted to detect the surface temperature (Tg) of said heating element; and
    a layer of radiant materials covering the outer surface of said heating element, having a spectral emissivity closely conforming to that of the surface of the human skin or clothes thereon, said layer of radiant materials comprising a metallic oxide pigment and a resin binder.

2. The thermal-environment sensor as claimed in claim 1, wherein said binder comprises synthetic resin.

3. The thermal-environment sensor as claimed in claim 2, wherein said resin is a fluorine containing resin.

4. The thermal-environment sensor as claimed in claim 1, wherein said metallic oxide pigment is titanium dioxide.

5. The thermal-environment sensor as claimed in claim 1, wherein said layer of radiant materials comprises titanium dioxide and tetrafluoroethylene.

6. The thermal-environment sensor as claimed in claim 5, wherein titanium dioxide comprises 20% to 50% by weight of the composition.

7. The thermal-environment sensor as claimed in claim 1, wherein said heating element comprises:
    an empty shell, the temperature of which is detected by said temperature detector; and
    an electric heater installed in said empty shell.

8. The thermal-environment sensor as claimed in claim 7, wherein the size of said empty shell of the heating element and the supplied thermal quantity (M) are determined so as to be equal to the thermal equilibrium of the human body with respect to evaporative heat loss.

9. The thermal-environment sensor as claimed in claim 8, wherein the size of said shell and said thermal quantity (M) to be supplied to the heating element are determined based on the following expressions;

$$hr = hgr$$
ti $hgc = hc'$ $$M = Hsk/Fcl$$

$$SET = Tg - Hsk/(Fcls \cdot hs')$$

wherein, (SET) is the new standard effective temperature defined by the American Society of Heating-Refrigerating and Air-conditioning Engineers (ASHRAE) (hr) is the radiant heat transfer coefficient, (hgr) is the radiant heat transfer coefficient of the heating element, (hgc) is the convective heat transfer coefficient of the heat element, (hc') is the convective heat transfer coefficient of the human body with respect to evaporation, (Hsk) is the heat loss from the surface of the human skin under the optional variable temperature environment, (Fcl) is the coefficient of heat resistance of clothes, (Fcls) is the coefficient of heat resistance of clothes in the case where the thermal resistance of the quantity of clothes is 0.6 clo, and (hs') is the total heat transfer coefficient of the human body caused by convection, evaporation, and radiation under the standard air flow.

10. The thermal-environment sensor as claimed in claim 9, wherein said shell is spherical-shaped, the diameter (D) of which ranges from 100 mm to 140 mm, the thermal quantity (M) supplied to the heating element ranging from 76 W/m² to 93 W/m².

11. The thermal-environment sensor as claimed in claim 9, wherein said shell is spherical-shaped, the diameter (D) of which is 60 mm, said thermal quantity (M) supplied to the heating element being 86 W/m² or 101 W/m².

12. The thermal-environment sensor as claimed in claim 9, wherein said shell is column-shaped, the diameter (D) of which is 80 mm, said thermal quantity (M) being 80 W/m².

13. The thermal-environment sensor as claimed in claim 7, wherein the shell is ellipsoid-of-revolution-shaped.

14. The thermal-environment sensor as claimed in claim 1, wherein said heating element comprises a heat insulator, and an electric heater installed on a part of said heat insulator, the surface temperature of said electric heater being detected by said temperature detector.

15. The thermal-environment sensor as claimed in claim 14, wherein said heat insulator is disk-shaped, the center of which is provided with said electric heater.

16. The thermal-environment sensor as claimed in claim 14, wherein the size of the heating element and the thermal quantity (M) to be supplied to said heating element are determined based on the following expressions;

$$hr = hgr$$

$$hgc = hc'$$

$$M = Hsk/Fcl$$

$$SET = Tg - Hsk/(Fcls \cdot hs')$$

wherein, (SET) is the new standard effective temperature defined by the American Society of Heating-Refrigerating and Air-conditioning Engineers (ASHRAE), (hr) is the radiant heat transfer coefficient, (hgr) is the radiant heat transfer coefficient of the heating element, (hgc) is the convective heat transfer coefficient of the heating element, (hc') is the convective heat transfer coefficient of the human body with respect to evaporation, (Hsk) is the heat loss from the surface of the human skin under the optional variable temperature environment, (Fcl) is the coefficient of heat resistance of the clothes, (Fcls) is the coefficient of heat resistance of clothes in the case where the thermal resistance of the quantity of clothes is 0.6 clo, (hs') is the total heat transfer coefficient of the human body caused by convection, evaporation, and radiation under the standard air flow 17. The thermal-environment sensor as claimed in claim 14, wherein said heat insulator is formed into the shell, a part of which is cut off and this cut-off portion of the shell is provided with said electric heater.

18. The thermal-environment sensor as claimed in claim 17, wherein said shell is revolution-shaped, on each portion of which are installed a pair of electric heaters, said heaters having a phase difference of 180 degrees around the central axis of said shell.

19. The thermal-environment sensor as claimed in claim 17, wherein said electric heater is provided with a heat conductor at the outside thereof.

20. The thermal-environment sensor as claimed in claim 17, wherein a heat insulator is attached surrounding said electric heater.

21. The thermal-environment sensor as claimed in claim 1, wherein the heating element comprises a shell and a panel-shaped electric heater on the surface of said shell in a pattern providing a constant heat flux.

* * * * *